(12) United States Patent
Larrew et al.

(10) Patent No.: US 11,463,739 B2
(45) Date of Patent: Oct. 4, 2022

(54) PARAMETER BASED LOAD BALANCING IN A DISTRIBUTED SURVEILLANCE SYSTEM

(71) Applicant: Seagate Technology LLC, Fremont, CA (US)

(72) Inventors: Greg D. Larrew, Longmont, CO (US); Margot A. LaPanse, Longmont, CO (US); Michael Habinsky, Longmont, CO (US); Michael E. Baum, Longmont, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 16/915,733

(22) Filed: Jun. 29, 2020

(65) Prior Publication Data

US 2021/0409790 A1 Dec. 30, 2021

(51) Int. Cl.
*H04N 21/231* (2011.01)
*H04N 7/18* (2006.01)
*H04N 21/234* (2011.01)
*H04N 21/4223* (2011.01)
*H04N 21/2187* (2011.01)

(52) U.S. Cl.
CPC ....... *H04N 21/23103* (2013.01); *H04N 7/181* (2013.01); *H04N 21/23113* (2013.01); *H04N 21/23418* (2013.01); *H04N 21/4223* (2013.01); *H04N 21/2187* (2013.01)

(58) Field of Classification Search
CPC ............ H04N 21/23103; H04N 7/181; H04N 21/23113; H04N 21/4223; H04N 21/23418; H04N 21/2187
See application file for complete search history.

(56) References Cited

U.S. PATENT DOCUMENTS

| 6,185,601 B1 | 2/2001 | Wolff |
| 6,665,721 B1 | 12/2003 | Hind et al. |
| 6,698,021 B1 | 2/2004 | Amini et al. |

(Continued)

FOREIGN PATENT DOCUMENTS

| EP | 2031824 B1 | 1/2018 |
| WO | 2017023615 A1 | 2/2017 |

OTHER PUBLICATIONS

Gil , et al., "Interactive live-streaming technologies and approaches for web-based applications", Multimed Tools Appl, 2017, 1-33.

*Primary Examiner* — Tat C Ohio
(74) *Attorney, Agent, or Firm* — Holzer Patel Drennan

(57) ABSTRACT

A distributed video management system for video surveillance that allows for monitoring a camera allocation parameter and dynamic reallocation of video cameras to available camera nodes in response to detecting a change in the allocation parameter. As such, the system may provide for load balancing of the processing of video data from the video cameras with reference to the allocation parameter. The change in allocation parameter may be due to a number of potential contexts, including a change in availability of camera nodes, a change in the nature of the video data captured, a change in computational load, or other change that results in a change in allocation parameter. The allocation parameter may be continually monitored to allocate video cameras to camera nodes in the system for enhanced system performance in view of potentially changing conditions.

15 Claims, 13 Drawing Sheets

(56) References Cited

U.S. PATENT DOCUMENTS

| | | |
|---|---|---|
| 7,366,836 B1 | 4/2008 | Todd et al. |
| 7,444,287 B2 | 10/2008 | Claudatos et al. |
| 8,291,484 B2 | 10/2012 | Hagens et al. |
| 8,300,098 B1 | 10/2012 | Gruttadauria et al. |
| 8,543,665 B2 | 9/2013 | Ansari et al. |
| 8,565,228 B1 | 10/2013 | Howard |
| 8,570,376 B1 | 10/2013 | Sharma et al. |
| 8,914,526 B1 | 12/2014 | Lindquist |
| 8,922,649 B2 | 12/2014 | Kim |
| 8,922,658 B2 | 12/2014 | Galvin |
| 9,143,759 B2 | 9/2015 | Choi et al. |
| 9,172,918 B2 * | 10/2015 | Palmer .................. H04N 7/181 |
| 9,204,103 B1 | 12/2015 | Zhang et al. |
| 9,456,131 B2 | 9/2016 | Tran |
| 9,704,393 B2 | 7/2017 | Acharya et al. |
| 9,756,294 B2 | 9/2017 | Saptharishi |
| 9,786,164 B2 | 10/2017 | Leblond |
| 9,805,265 B2 | 10/2017 | Itoh et al. |
| 10,284,912 B2 | 5/2019 | Frusina et al. |
| 10,395,262 B2 | 8/2019 | Faith et al. |
| 10,769,913 B2 | 9/2020 | Wang et al. |
| 10,853,882 B1 | 12/2020 | Leise et al. |
| 10,929,707 B2 | 2/2021 | Narasimha et al. |
| 11,108,844 B1 | 8/2021 | Lorenzi et al. |
| 2002/0095488 A1 | 7/2002 | Primak |
| 2003/0142745 A1 | 7/2003 | Osawa |
| 2004/0064575 A1 | 4/2004 | Rasheed et al. |
| 2005/0271251 A1 | 12/2005 | Russell et al. |
| 2006/0077254 A1 | 4/2006 | Shu et al. |
| 2007/0024707 A1 | 2/2007 | Brodsky |
| 2007/0107032 A1 | 5/2007 | Rachamadugu |
| 2008/0240696 A1 | 10/2008 | Kucharyson |
| 2009/0003439 A1 | 1/2009 | Wang et al. |
| 2009/0015671 A1 | 1/2009 | Addy |
| 2009/0031381 A1 | 1/2009 | Cohen et al. |
| 2009/0286529 A1 | 11/2009 | Chang |
| 2010/0036759 A1 | 2/2010 | Ben-Yaacov et al. |
| 2010/0067525 A1 | 3/2010 | Matsui |
| 2010/0097473 A1 | 4/2010 | Park et al. |
| 2011/0013018 A1 | 1/2011 | Leblond |
| 2011/0058036 A1 | 3/2011 | Metzger et al. |
| 2012/0154606 A1 | 6/2012 | Ye et al. |
| 2012/0158894 A1 | 6/2012 | Desgagne et al. |
| 2012/0230401 A1 | 9/2012 | Chen et al. |
| 2012/0265847 A1 | 10/2012 | Swenson et al. |
| 2012/0331499 A1 | 12/2012 | Hagens et al. |
| 2013/0222587 A1 | 8/2013 | Roskowski |
| 2013/0322552 A1 | 12/2013 | Mishra et al. |
| 2014/0074987 A1 | 3/2014 | Martz et al. |
| 2014/0085480 A1 | 3/2014 | Saptharishi |
| 2014/0143590 A1 | 5/2014 | Bagga et al. |
| 2015/0020088 A1 | 1/2015 | Velasco et al. |
| 2015/0055832 A1 | 2/2015 | Ptitsyn |
| 2015/0172228 A1 | 6/2015 | Zalepa et al. |
| 2016/0035198 A1 | 2/2016 | Coviello |
| 2016/0110993 A1 | 4/2016 | Marlatt et al. |
| 2016/0191779 A1 | 6/2016 | Yang et al. |
| 2016/0219117 A1 * | 7/2016 | Marlatt ................. H04L 67/322 |
| 2017/0061214 A1 | 3/2017 | Huang et al. |
| 2017/0078626 A1 | 3/2017 | Chowdhery et al. |
| 2017/0208349 A1 | 7/2017 | Saptharishi |
| 2017/0272488 A1 | 9/2017 | Totzke et al. |
| 2018/0091741 A1 | 3/2018 | Ida et al. |
| 2019/0188042 A1 | 6/2019 | Koh et al. |
| 2019/0238798 A1 * | 8/2019 | Liu ...................... G08B 13/196 |
| 2019/0272289 A1 | 9/2019 | Choi et al. |

* cited by examiner ically incorpo- 20 parameter.
PARAMETER BASED LOAD BALANCING IN A DISTRIBUTED SURVEILLANCE SYSTEM

CROSS-REFERENCE TO RELATED APPLICATIONS

The present application is related to U.S. patent application Ser. No. 16/915,824 filed Jun. 29, 2020 entitled "SELECTIVE USE OF CAMERAS IN A SURVEILLANCE SYSTEM," U.S. patent application Ser. No. 16/915,941 filed Jun. 29, 2020 entitled "LOW LATENCY BROWSER BASED CLIENT INTERFACE FOR A DISTRIBUTED SURVEILLANCE SYSTEM," U.S. patent application Ser. No. 16/915,905 filed Jun. 29, 2020 entitled "DISTRIBUTED SURVEILLANCE SYSTEM WITH ABSTRACTED FUNCTIONAL LAYERS," and U.S. patent application Ser. No. 16/915,990 filed Jun. 29, 2020 entitled "DISTRIBUTED SURVEILLANCE SYSTEM WITH DISTRIBUTED VIDEO ANALYSIS," all of which are filed concurrently herewith and are specifically incorporated by reference for all that they disclose and teach.

BACKGROUND

Video surveillance systems are valuable security resources for many facilities. In particular, advances in camera technology have made it possible to install video cameras in an economically feasible fashion to provide robust video coverage for facilities to assist security personnel in maintaining site security. Such video surveillance systems may also include recording features that allow for video data to be stored. Stored video data may also assist entities in providing more robust security, allowing for valuable analytics, or assisting in investigations. Live video data feeds may also be monitored in real-time at a facility as part of facility security.

While advances in video surveillance technology have increased the capabilities and prevalence of such systems, a number of drawbacks continue to exist that limit the value of these systems. For instance, while camera technology has drastically improved, the amount of data generated by such systems continues to increase. This creates a problem of how to effectively store large amounts of video data in a way that allows for easy retrieval or other processing. In turn, effective management of video surveillance data has become increasingly difficult.

Proposed approaches for the management of video surveillance systems include the use of a network video recorder to capture and store video data or the use of an enterprise server for video data management. As will be explained in greater detail below, such approaches each present unique challenges. Accordingly, the need continues to exist for improved video surveillance systems with robust video data management and access.

SUMMARY

The present disclosure generally relates to a distributed video surveillance system that includes distributed processing resources capable of processing and/or storing video data from a plurality of video cameras at a plurality of camera nodes. One particular aspect of the present disclosure includes the adaptive allocation of video cameras to camera nodes for processing the video data in relation to an allocation parameter. In this regard, the allocation of video cameras to the camera nodes in the system may provide load balancing of the allocation parameter. Furthermore, the dynamic or adaptive allocation of cameras may provide robustness to the system in view of potential changes in the allocation parameter.

Accordingly, a first aspect of the present disclosure includes a method for processing video data in a video surveillance system. The method includes capturing video data at a plurality of video cameras and communicating the video data from the plurality of video cameras to at least one camera node over a communication network according to a first camera allocation configuration. A video processing module is executed at a camera node to process the video data received at the camera node. The method also includes monitoring a camera allocation parameter at the camera node. The camera allocation parameter is at least in part based on the video data received at one or more camera nodes. The method also includes modifying the first camera allocation configuration to a second camera allocation configuration different than the first camera allocation configuration, at least in part based on the camera allocation parameter.

Another aspect of the present disclosure includes a video surveillance system that includes a plurality of video cameras operative to capture video data and at least one camera node operative to receive video data from one or more video cameras of the plurality of video cameras according to a first camera allocation configuration. The system also includes a video processing module executing at the one or more camera nodes to process the video data received at those camera nodes. A master node is in operative communication with the at least one camera node to monitor a camera allocation parameter at least in part based on the video data received at the at least one camera node. The master node is operative to, in response to a change in the camera allocation parameter, modify the first camera allocation configuration to a second camera allocation configuration different than the first camera allocation configuration.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
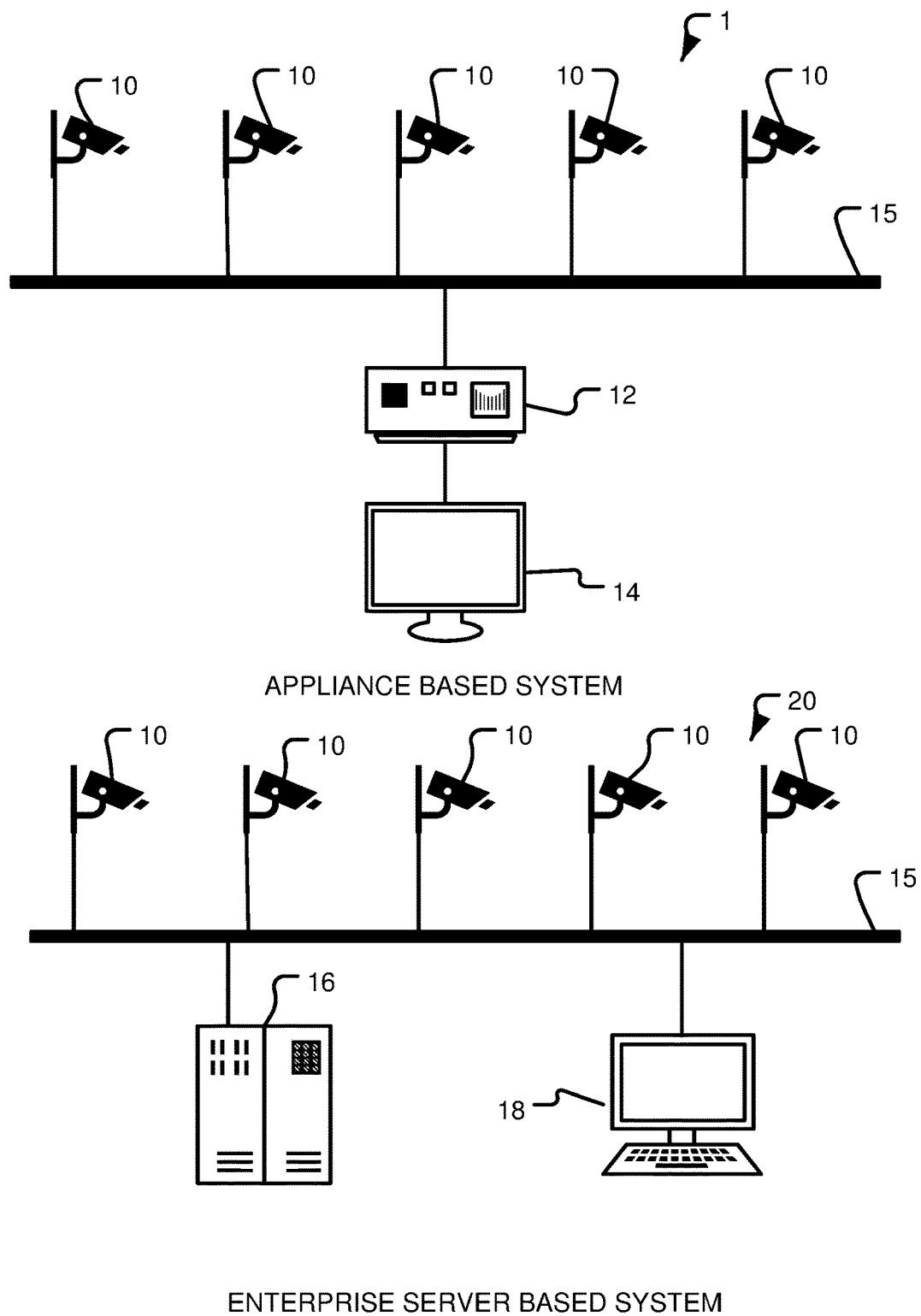
FIG. 1 depicts two examples of prior art video surveillance systems.

While the examples in the following disclosure are susceptible to various modifications and alternative forms, specific examples are shown in the drawings and are herein described in detail. It should be understood, however, that it is not intended to limit the scope of the disclosure to the particular form disclosed, but rather, the disclosure is to cover all modifications, equivalents, and alternatives falling within the scope defined by the claims.

FIG. 1 depicts two prior art approaches for the system architecture and management of a video surveillance system. The two approaches include an appliance-based system 1 shown in the top portion of FIG. 1 and an enterprise server-based approach 20 in the bottom portion of FIG. 1. In the appliance-based system 1, video cameras 10 are in operative communication with a network 15. An appliance 12 is also in communication with the network 15. The appliance 12 receives video data from the video cameras 10 and displays the video data on a monitor 14 that is connected to the appliance 12.

Appliance based systems 1 generally provide a relatively low-cost solution given the simplicity of the hardware required to implement the system 1. However, due to the limited processing capability of most appliances 12, the number of cameras that are supported in an appliance-based system may be limited as all video cameras 10 provide video data exclusively to the appliance 12 for processing and display on the monitor 14. Moreover, the system is not scalable, as once the processing capacity of the appliance 12 has been reached (e.g., due to the number of cameras in the system 1), no further expansion of additional cameras may be provided. Instead, to supplement a system 1, an entirely new appliance 12 must be implemented as a separate, stand-alone system without integration with the existing appliance 12. Also, due to the relatively limited processing capacity of the appliance 12, appliance-based systems 1 provide a limited capability for video data analytics or storage capacity. Additionally, such systems 1 typically facilitate viewing and/or storage of a limited number of live video data feeds from the video cameras 10 at any given time and usually allow the presentation of such video only on a single monitor 14 or a limited number of monitors connected to the appliance 12. That is, to review real-time or archived video data, a user must be physically present at the location of the appliance 12 and monitor 14.

Enterprise server-based systems 20 typically include a plurality of video cameras 10 in operative communication with a network 15. A server instance 16 is also in communication with the network 15 and receives all video data from all the video cameras 10 for processing and storage of the data. The server 16 usually includes a storage array and acts as a digital video recorder (DVR) to store the video data received from the video cameras 10. A client 18 may be connected to the network 15. The client 18 may allow for the viewing of video data from the server 16 away from the physical location of the server 16 (e.g., in contrast to the appliance-based system 1 in which the monitor 14 is connected directly to the appliance 12). However, the server 16 typically includes platform-dependent proprietary software for digesting video data from the cameras 10 for storage in the storage array of the server 16.

Furthermore, the server 16 and client 18 include platform-dependent proprietary software to facilitate communication between the server 16 and the client 18. Accordingly, a user or enterprise must purchase and install the platform-dependent client software package on any client 18 desired to be used to access the video data and/or control the system 20. This limits the ability of a user to access video data from the system 20 as any user must have access to a preconfigured client 18 equipped with the appropriate platform-dependent proprietary software, which requires licensing such software at an additional cost.

In contrast to the appliance-based systems 1, enterprise server-based systems 20 are usually relatively expensive implementations that may be targeted to large-scale enterprise installations. For example, such systems 20 typically require very powerful servers 16 to facilitate the management of the video data from the cameras 10 as a single server 16 handles all processing and storage of all video data from the system. Also, the platform-dependent proprietary software for the server 16 and clients 18 require payment of license fees that may be based on the number of cameras 10 and/or the features (e.g., data analytics features) available to the user. Further still, the proprietary software to allow the functionality of the client 18 must be installed and configured as a stand-alone software package. In turn, the installation and maintenance of the software at the client 18 may add complexity to the system 1. Further still, in the event a user wishes to use a different client 18 device, any such device must first be provisioned with the necessary software resources to operate. Thus, the ability to access and manage the system 1 is limited.

While such an enterprise server-based system 20 may be scaled, the capital cost of expansion of the system 20 is high. Specifically, the server 16, despite the increased computational complexity relative to an appliance 12, does have a limit on the number of cameras 10 it may support, although this limit is typically higher than the number of cameras 10 an appliance 12 can support. In any regard, once the maximum number of cameras 10 is reached, any additional camera 10 requires the purchase of, in effect, a new system 20 with an additional server 16 or by increasing the capacity of the server 16 along with increase payment of licensing fees for the additional server 16 or capacity. Furthermore, the proprietary software that is required to be installed at the client 18 is typically platform-dependent and needed for any client 18 wishing to interact with the system 20. This adds complexity and cost to any client 18 and limits the functionality of the system 20. Further still, enterprise server-based systems 20 include static camera-to-server mappings such that in the event of a server unavailability or failure, all cameras 10 mapped to the server 16 that fails become unavailable for live video streams or storage of video data, thus rendering the system 20 ineffective in the event of such a failure.

Figure 2:
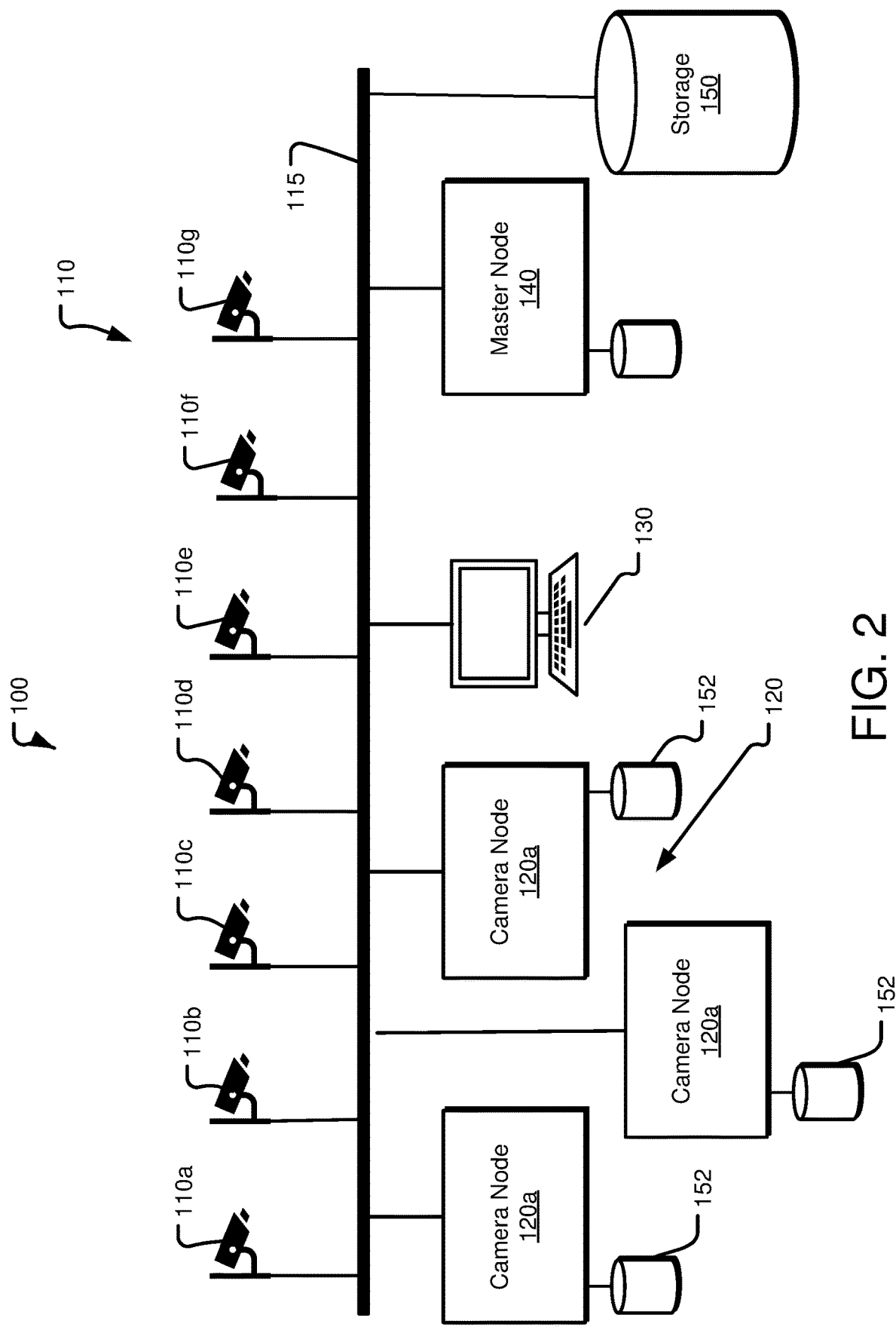
FIG. 2 depicts an example of a distributed video surveillance system according to the present disclosure.

Accordingly, the present disclosure relates to a distributed video management system (VMS) 100 that includes a distributed architecture. One example of such a VMS 100 is depicted in FIG. 2. The distributed architecture of the VMS 100 facilitates a number of benefits over an appliance-based system 1 or a server-based system 20 described above. In general, the VMS 100 includes three functional layers that may be abstracted relative to one another to provide the ability to dynamically reconfigure mappings between video cameras 110, camera nodes 120 for processing the video data, and storage capacity 150/152 within the VMS 100. While this is discussed in greater detail below, the abstraction of the functional layers of the VMS 100 facilitates a highly dynamic and configurable system that is readily expandable, robust to component failure, capable of adapting to a given occurrence, and cost-effective to install and operate. Because the functional layers are abstracted, static component-to-component mappings need not be utilized. That is, any one or more video cameras 110 can be associated with any one of a plurality of camera nodes 120 that may receive the video data from associated cameras 110 for processing of the video data from the associated cameras 110. In turn, the camera nodes 120 process the video data (e.g., either for storage in a storage volume 150/152 or for real-time streaming to a client device 130 for live viewing of the video data). Camera nodes 110 may be operative to execute video analysis on the video data of associated cameras 110 or from stored video data (e.g., of an associated video camera 100 or a non-associated video camera 110). Further still, as the storage resources of the system 100 are also abstracted from the camera nodes 120, video data may be stored in a flexible manner that allows for retrieval by any of the camera nodes 120 of the system.

In this regard, upon failure of any given node in the system, cameras assigned to the failed camera node may be reassigned (e.g., automatically) to another camera node such that processing of the video data is virtually uninterrupted. Also, camera-to-node associations may be dynamically modified in response to actual processing conditions at a node (e.g., cameras may be associated to another node from a node performing complex video analysis) Similarly, as the camera nodes 120 may be relatively inexpensive hardware components, additional camera nodes 120 may be easily added (e.g., in a plug-and-play fashion) to the system 100 to provide highly granular expansion capability (e.g., versus having to deploy entire new server instances in the case of the server-based system 20 that only offer low granularity expansion).

The flexibility of the VMS system 100 extends to clients 130 in the system. The clients 130 may refer to a client device or software delivered to a device to execute at the device. In any regard, a client 130 may be used to view video data of the VMS 100 (e.g., either in real-time or from storage 150/152 of the system 100). Specifically, the present disclosure contemplates the use of a standard web browser application commonly available and executable on a wide variety of computing devices. As described in greater detail below, the VMS 100 may utilize processing capability at each camera node 120 to process video data into an appropriate transport mechanism, which may be at least in part based on a context of a request for video data. As an example, a request from a client 130 for viewing of live video data in real-time from a camera 110 may result in a camera node 120 processing the video data of a camera 110 into a real-time, low latency format for delivery to the client 130. Specifically, such a low latency protocol may include a transport mechanism that allows the data to be received and rendered at the client using a standard web browser using only native capability of the standard web browser or via executable instructions provided by a web page sent to the client 130 for rendering in the standard web browser (e.g., without requiring the installation of external software at the client in the form of third-party applications, browser plug-ins, browser extensions, or the like). In turn, any computing device executing a standard web browser may be used as a client 130 to access the VMS 100 without requiring any proprietary or platform-dependent software and without having any pre-configuration of the client 130. This may allow for access by any computing system operating any operating system so long as the computing device is capable of executing a standard web browser. As such, desktop, laptop, tablets, smartphones, or other devices may act as a client 130.

The abstracted architecture of the VMS 100 may also allow for flexibility in processing data. For instance, the camera nodes 120 of the VMS 100 may apply analytical models to the video data processed at the camera node 120 to perform video analysis on the video data. The analytical model may generate analytical metadata regarding the video data. Non-limiting examples of analytical approaches include object detection, object tracking, facial recognition, pattern recognition/detection, or any other appropriate video analysis technique. Given the abstraction between the video cameras 110 and the camera nodes 120 of the VMS 100, the configuration of the processing of the video data may be flexible and adaptable, which may allow for the application of even relatively complex analytical models to some or all of the video data with dynamic provisioning in response to peak analytical loads.

With continued reference to FIG. 2, a VMS 100 for management of edge surveillance devices in a surveillance system according to the present disclosure is depicted schematically. The VMS 100 includes a plurality of cameras 110 that are each in operative communication with a network 115. For example, as shown in FIG. 2, cameras 110a through 110g are shown. However, it should be understood that additional or fewer cameras may be provided in a VMS 100 according to the present disclosure without limitation.

The cameras 110 may be internet protocol (IP) cameras that are capable of providing packetized video data from the camera 110 for transport on the network 115. The network 115 may be a local area network (LAN). In other examples, the network 115 may be any appropriate communication network including a publicly-switched telephone network (PSTN), intranet, wide area network (WAN) such as the internet, digital subscriber line (DSL), fiber network, or other appropriate networks without limitation. The video cameras 110 may each be independently associable (e.g., assignable) to a given one of a plurality of camera nodes 120.

As such, the VMS 100 also includes a plurality of camera nodes 120. For example, in FIG. 2, three camera nodes 120 are shown, including a first camera node 120a, a second camera node 120b, and a third camera node 120c. However, it should be understood that additional or fewer camera nodes 120 may be provided without departing from the scope of the present disclosure. Furthermore, camera nodes 120 may be added to or removed from the system 100 at any time, in which case, camera-to-node assignments or mappings may be automatically reconfigured. Each of the camera nodes 120 may also be in operative communication with the network 115 to facilitate receipt of video data from the one or more of the cameras 110 associated with each respective node 120.

The VMS 100 also includes at least one master node 140. The master node 140 may be operative to manage the operation and/or configuration of the camera nodes 120 to receive and/or process video data from the cameras 110, coordinate storage resources of the VMS 100, generate and maintain a database related to captured video data of the VMS 100, and/or facilitate communication with a client 130 for access to video data of the system 100.

While a single master node 140 is shown and described, the master node 140 may comprise a camera node 120 tasked with certain system management functions. Not all management functions of the master node 140 need to be executed by a single camera node 120. In this regard, while a single master node 140 is described for simplicity, it may be appreciated that the master node functionality described herein in relation to a single master node 140 may actually be distributed among different ones of the camera nodes 120. As such, a given camera node 120 may act as the master node 140 for coordination of camera assignments to the camera nodes 120, while another camera node 120 may act as the master node 140 for maintaining the database regarding the video data of the system. Accordingly, as will be described in greater detail below, various management functions of the master node 140 may be distributed among various ones of the camera nodes 120. Accordingly, while a single given master node 140 is shown, it may be appreciated that any one of the camera nodes 120 may act as a master node 140 for different respective functions of the system 100.

Furthermore, the various management functions of the master node 140 may be subject to leader election to allocate such functions to different ones of the camera nodes 120 for the execution of the master node functionality. For example, the role of master node 140 may be allocated to a given camera node 120 using leader election techniques such that all management functions of the master node 140 are allocated to a given camera node 120. Alternatively, individual ones of the management functions may be individually allocated to one or more camera nodes 120 using leader election. This provides a robust system in which even the unavailability of a master node 140 or a camera node 120 executing some management functions can be readily corrected by applying leader election to elect a new master node 140 in the system or to reallocate management functionality to a new camera node 120.

The hardware of the camera node 120 and the master node 140 may be the same. In other examples, a dedicated master node 140 may be provided that may have different processing capacity (e.g., more or less capable hardware in terms of processor and/or memory capacity) than the other camera nodes 120. Furthermore, not all camera nodes 120 may include the same processing capability. For instance, certain camera nodes 120 may include increased computational specifications relative to other camera nodes 120, including, for example, increased memory capacity, increased processor capacity/speed, and/or increased graphical processing capability.

As may be appreciated, the VMS 100 may store video data from the video cameras 110 in storage resources of the VMS 100. In one implementation, storage capacity may be provided in one or more different example configurations. Specifically, in one example, each of the camera nodes 120 and/or the master node 140 may have attached storage 152 at each respective node. In this regard, each respective node may store the video data metadata processed by the node and any metadata generated at the node at the corresponding attached storage 152 at each respective node for video data processed at the node 120. In an alternative arrangement, the locally attached storage 152 at each of the camera nodes 120 and the master node 140 may comprise physical drives that are abstracted into a logical storage unit 150. In this regard, it may be that video data processed at a first one of the nodes may be, at least in part, communicated to another of the nodes for storage of the data. In this regard, the logical storage unit 150 may be presented as an abstracted storage device or storage resource that is accessible by any of the nodes 120 of the system 100. The actual physical form of the logical storage unit 150 may take any appropriate form or combination of forms. For instance, the physical drives associated with each of the nodes may comprise a storage array such as a RAID array, which forms a single virtual volume that is addressable by any of the camera nodes 120 or the master node 140. Additionally or alternatively, the logical storage unit 150 may be in operative communication with the network 115 with which the camera nodes 120 and master node 140 are also in communication. In this regard, the logical storage unit 150 may comprise a network-attached storage (NAS) device capable of receiving data from any of the camera nodes 120. The logical storage unit 150 may include storage devices local to the camera nodes 120 or may comprise remote storage such as a cloud-based storage resource or the like. In this regard, while a logical storage unit 150 and locally attached storage 152 are both shown in FIG. 2, the locally attached storage 152 may comprise at least a portion of the logical storage unit 150. Furthermore, the VMS 100 need not include both types of storage, which are shown in FIG. 2 for illustration only.

Figure 3:
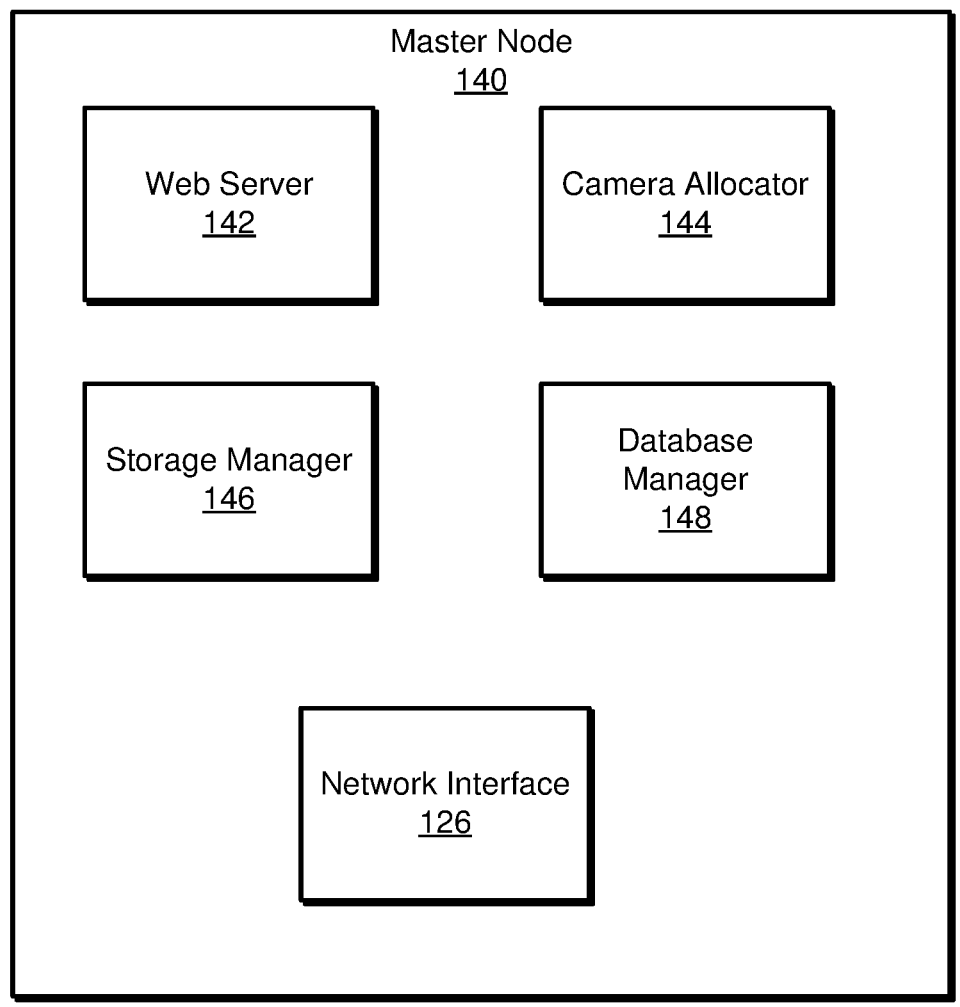
FIG. 3 depicts a schematic view of an example master node of a distributed video surveillance system.

With further reference to FIG. 3, a schematic drawing illustrating an example of a master node 140 is shown. The master node 140 may include a number of modules for management of the functionality of the VMS 100. As described above, while a single master node 140 is shown that comprises the master node modules, it should be appreciated that any of the camera nodes 120 may act as a master node 140 for any individual functionality of the master node modules. That is, the role of the master node 140 for any one or more of the master node functionalities may be distributed among the camera nodes 120. In any regard, the modules corresponding to the master node 140 may include a web server 142, a camera allocator 144, a storage manager 146, and/or a database manager 148. In addition, the master node 140 may include a network interface 126 that facilitates communication between the master node 140 and video cameras 110, camera nodes 120, storage 150, a client 130, or other components of the VMS 100.

The web server 142 of the master node 140 may coordinate communication with a client 130. For example, the web server 142 may communicate a user interface (e.g., HTML code that defines how the user interface is to be rendered by the browser) to a client 130, which allows a client 130 to render the user interface in a standard browser application. The user interface may include design elements and/or code for retrieving and displaying video data from the VMS 100 in a manner that is described in greater detail below.

With respect to the camera allocator 144, the master node 140 may facilitate camera allocation or assignment such that the camera allocator 144 creates and enforces camera-to-node mappings to determine which camera nodes 120 are tasked with processing video data from the video cameras 110. That is, in contrast to the appliance-based system 1 or the enterprise server-based system 50, subsets of the video cameras 110 of the VMS 100 may be assigned to different camera nodes 120. For instance, the camera allocator 144 may be operative to communicate with a video camera 110 to provide instructions to the video camera 110 regarding a camera node 120 the video camera 110 is to send its video data. Alternatively, the camera allocator 144 may instruct the camera nodes 120 to establish communication with and receive video data from specific ones of the video cameras 110. The camera allocator 144 may create such camera-to-node associations and record the same in a database or other data structure. In this regard, the system 100 may be a distributed system in that any one of the camera nodes 120 may receive and process video data from any one or more of the video cameras 110.

Furthermore, the camera allocator 144 may be operative to dynamically reconfigure the camera-to-node mappings in a load balancing process. In this regard, the camera allocator 144 may monitor an allocation parameter at each camera node 120 to determine whether to modify the camera-to-node mappings. In this regard, changes in the VMS 100 may be monitored, and the camera allocator 144 may be responsive to modify a camera allocation from a first camera allocation configuration to a second camera allocation configuration to improve or maintain system performance. The allocation parameter may be any one or more of a plurality of parameters that are monitored and used in determining camera allocations. Thus, the allocation parameter may change in response to a number of events that may occur in the VMS 100 as described in greater detail below.

For example, in the event of a malfunction, power loss, or another event that results in the unavailability of a camera node 120, the camera allocator 144 may detect or otherwise be notified of the unavailability of the camera node. In turn, the camera allocator 144 may reassign video cameras previously associated with the unavailable node to another node 120. The camera allocator 144 may communicate with the reassigned cameras 110 to update the instructions for communication with the new camera node 120. Alternatively, the newly assigned camera node may assume the role of establishing contact with and processing video data from the video cameras 110 that were previously in communication with the unavailable camera node 120 to update the instructions and establish the new camera-to-node assignment based on the new assignment provided by the camera allocator 144. In this regard, the system 100 provides increased redundancy and flexibility in relation to processing video data from the cameras 100. Further still, even in the absence of a camera node 120 failure, the video data feeds of the cameras 110 may be load balanced to the camera nodes 120 to allow for different analytical models or the like to be applied.

A given camera node 120 may be paired with a subset of the cameras 110 that includes one or more of the cameras 110. As an example, in FIG. 2, cameras 110*a*-110*c* may be paired with camera manager 120*a* such that the camera manager 120*a* receives video data from cameras 110*a*-110*c*. Cameras 110*d*-110*f* may be paired with camera manager 120*b* such that the camera manager 120*b* receives video data from cameras 110*d*-110*f*. Camera 110*g* may be paired with camera manager 120*c* such that the camera manager 120*c* receives video data from camera 100*g*. However, this configuration could change in response to a load balancing operation, a failure of a given camera node, network conditions, or any other parameter.

Figure 8:
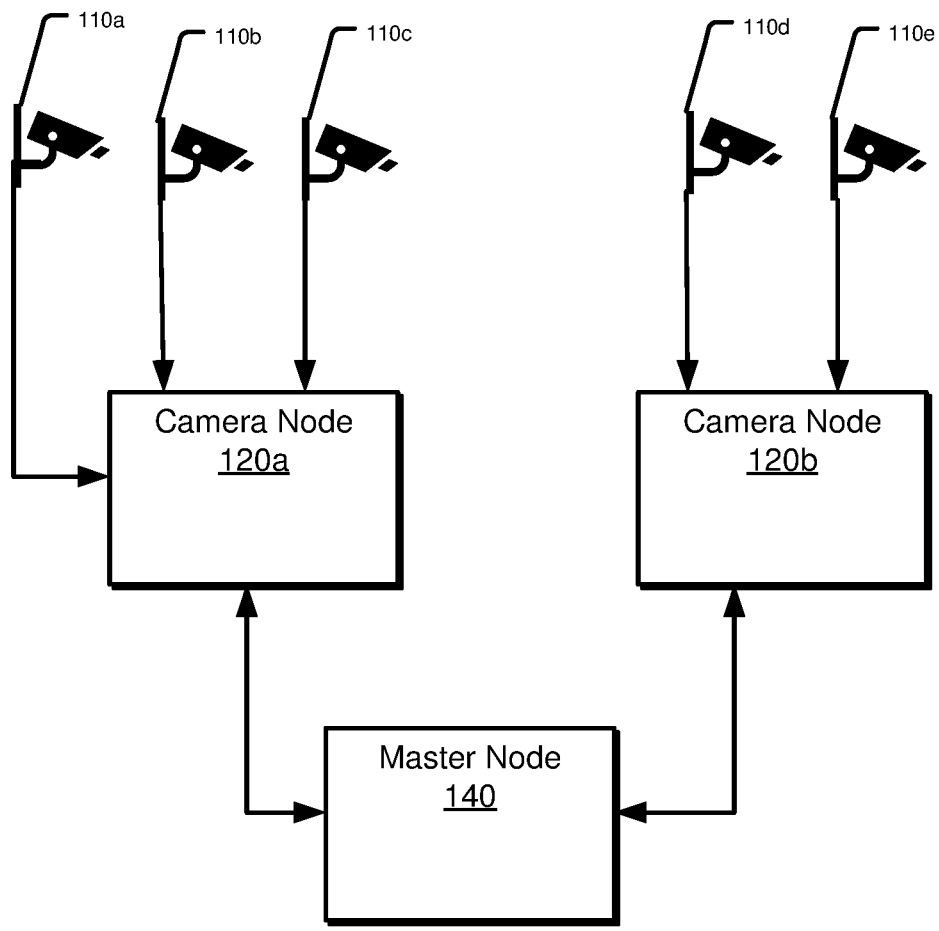
FIG. 8 depicts an example of a first camera allocation configuration of a plurality of video cameras and camera nodes of a distributed video management system.
Figure 9:
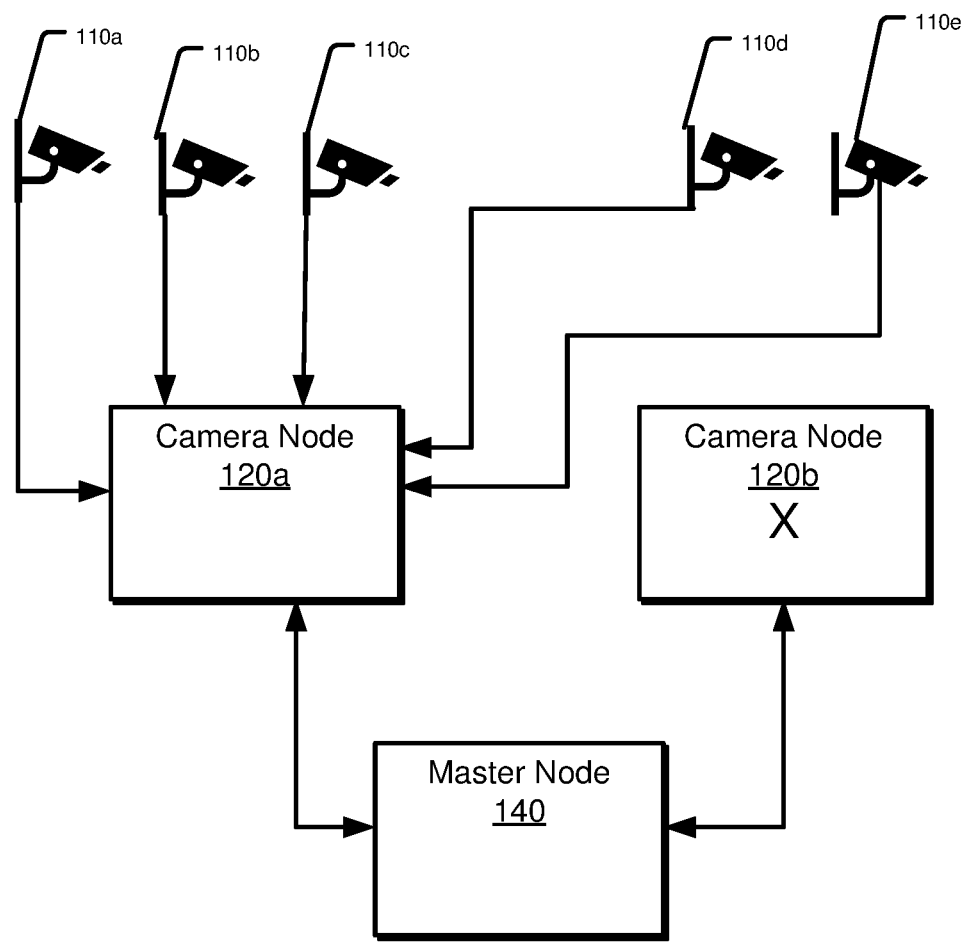
FIG. 9 depicts an example of a second camera allocation configuration of a plurality of video cameras and camera nodes of a distributed video management system in response to the detection of a camera node being unavailable.

For instance, and with reference to FIG. 8, a first camera allocation configuration is shown. Two camera nodes, camera node 120*a* and camera node 120*b*, may process data from video cameras 110*a*-110*e* via a network 115. FIG. 9 is a schematic representation presented for illustration. As such, while the cameras 110 are shown as being in direct communication with the nodes 120, the cameras 110 may communicate with the nodes 120 via a network connection. Similarly, while the master node 140 is shown as being in direct communication with the camera nodes 120, this communication may also be via a network 115 (not shown in FIG. 8). In any regard, in the first camera allocation configuration shown in FIG. 8, video camera 110*a*, video camera 110*b*, and video camera 110*c* communicate video data to a first camera node 120*a* for processing and/or storage of the video data by the first camera node 120*a*. Also, video camera 110*d* and video camera 110*e* communicate video data to a second camera node 120*b* for processing and/or storage of the video data by the first camera node 120*b*. The first camera allocation may be established by a camera allocator 144 of the master node 140 in a manner that distributes the mapping of the video cameras 110 among the available camera nodes 120 to balance the allocation parameter among the camera nodes 120.

Upon detection of a change in the allocation parameter, the camera allocator 144 may modify the first camera allocation in response to the detecting a change in the monitored allocation parameter. Such a change may, for example, be in response to the addition or removal of a camera node 120 from the VMS 100, upon a change in computational load at a camera node 120, upon a change in video data from a video camera 110, or any other change that results in a change in the allocation parameter. For instance, with further reference to FIG. 9, a scenario is depicted in which camera node 120*b* becomes unavailable (e.g., due to loss of communication at the camera node 120*b*, loss of power at the camera node 120*b*, or any other malfunction or condition that results in the camera node 120*b* losing the ability to process and/or store video data). In response, the master node 140 may detect such a change and modify the first camera allocation configuration from that shown in FIG. 8 to a second camera allocation configuration, as shown in FIG. 9.

In the second camera allocation configuration shown in FIG. 9, all cameras 110*a*-110*e* are mapped to communicate with the camera node 120*a*. However, it should be appreciated that other camera nodes 120 (not shown in FIG. 9) could also have one or more of video camera 110*d* and video camera 110*e* allocated to any available node 120 in the VMS 100. As such, the two camera nodes 120*a* and 120*b* are shown for simplicity of explanation only. In this regard, the modification of the camera allocation configuration may be at least in part based on the allocation parameter. That is, the camera allocation parameter may be used to load balance the system (e.g., based on the allocation parameter) based on the video data of the cameras 110 across all available camera nodes 120. Thus, while all cameras 110 are reallocated to the first camera node 120*a* in FIG. 9, cameras 110*d* and 110*e* could be otherwise allocated to alternative camera nodes to balance the computational and storage load or other allocation parameters across all available nodes 120.

Also, while a camera node 120 is shown as becoming unavailable in FIG. 9, another scenario in which load balancing may occur is the addition of one or more camera nodes 120 to the system such that one or more additional camera nodes may become available. In this scenario, a new camera allocation configuration may be generated to balance the video data processing of all cameras 110 in the VMS 100 with respect to an allocation parameter based on the video data generated by the cameras 110. In this regard, it may be appreciated that a change in the allocation parameter monitored by the camera allocator 144 of the master node 140 may occur in response to any number of conditions, and this change may result in a modification of an existing camera allocation configuration.

As such, the allocation parameter may relate to the video data of the camera nodes 110 being allocated. The allocation parameter may, for example, relate to a time-based parameter, the spatial coverage of the cameras, a computational load of processing the video data of a camera, an assigned class of camera, an assigned priority of a camera. The allocation parameter may be at least in part affected by the nature of the video data of a given camera. For instance, a given camera may present video data that is more computationally demanding than another camera. For instance, a first camera may be directed at a main entrance of a building. A second camera may be located in an internal hallway that is not heavily trafficked. Video analysis may be applied to both sets of video data from the first camera and the second camera to perform facial recognition. The video data from the first camera may be more computationally demanding on a camera node than the video data from the second camera simply by virtue of the nature/location of the first camera being at the main entrance and including many faces compared to the second camera. In this regard, the camera allocation parameter may be at least in part based on the video data of the particular cameras to be allocated to the camera nodes.

Figure 10:
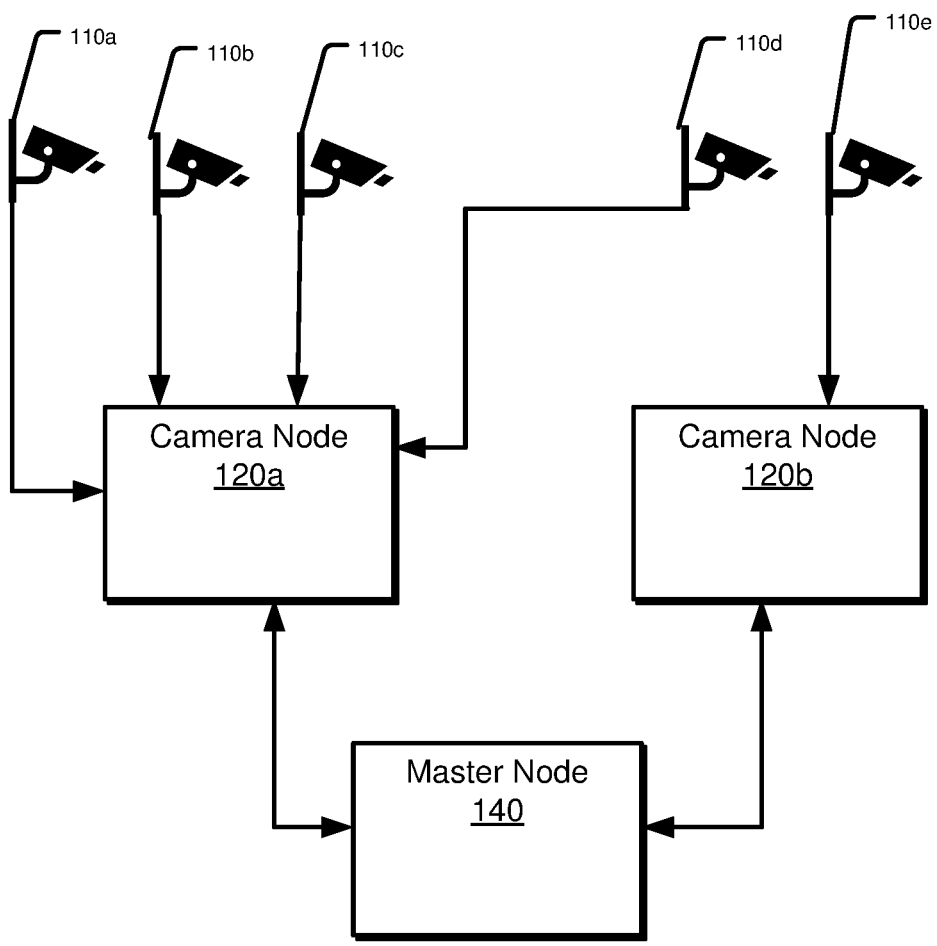
FIG. 10 depicts an example of a second camera allocation configuration of a plurality of video cameras and camera nodes of a distributed video management system in response to a change in an allocation parameter at one of the camera nodes.

In this regard, FIG. 10 depicts another scenario in which a change in a camera allocation parameter is detected, and the camera allocation configuration is modified in response to the change. FIG. 10 may modify a first camera allocation configuration from FIG. 8 to a second camera allocation configuration shown in FIG. 10. In FIG. 10, video camera 110e may begin to capture video data that results in a computational load on camera module 120b increasing beyond a threshold. In turn, the camera allocator 144 of the master node 140 may detect this change and modify the first camera allocation configuration to the second camera allocation configuration such that camera 110d is associated with camera node 120a. That is, camera node 120b may be exclusively dedicated to processing video data from camera 110e in response to a change in the video that increases the computational load for processing this video data. Examples could be the video data including significantly increased detected objects (e.g., additional faces to be processed using facial recognition) or motion that is to be processed. In this example shown in FIG. 10, camera node 120a may have sufficient capacity to process the video data from camera 110d.

Figure 11:
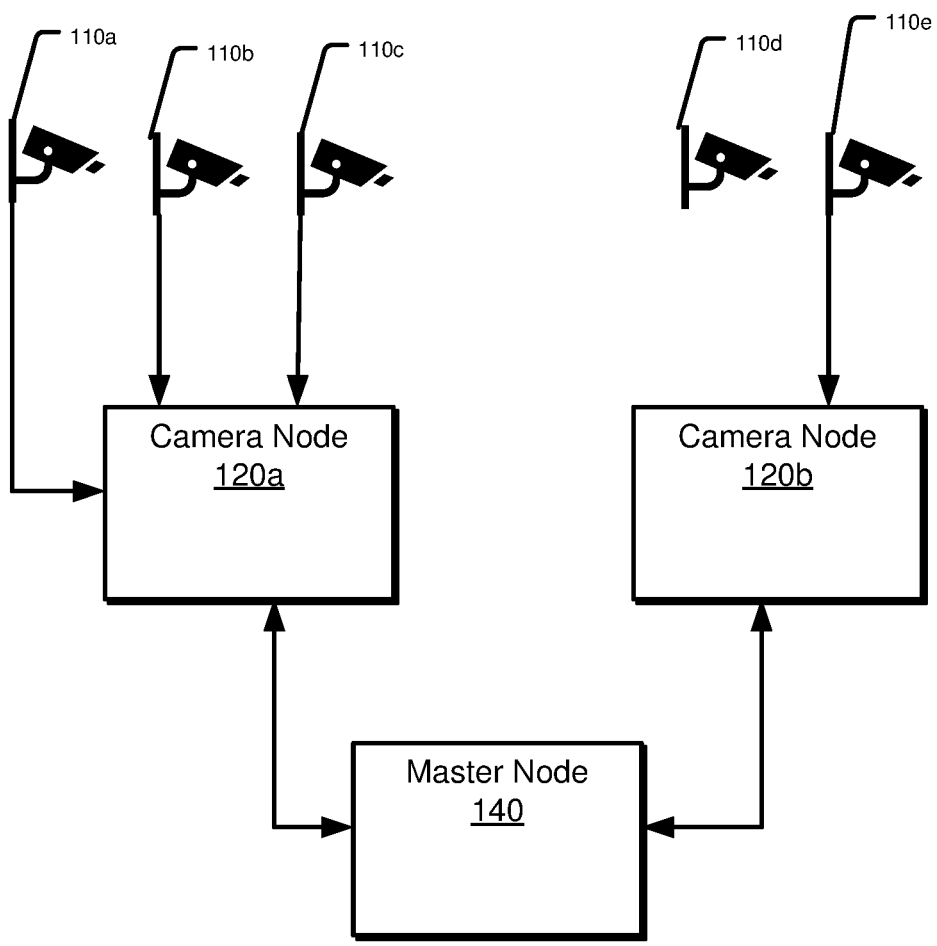
FIG. 11 depicts an example of a second camera allocation configuration of a plurality of video cameras and camera nodes of a distributed video management system in which a video camera is disconnected from any camera node based on a priority for the video camera.

FIG. 11 further illustrates an example in which a total computational capacity of the VMS 100 based on the available camera nodes 120 is exceeded. In the scenario depicted in FIG. 11, a camera 110d may be disconnected from any camera node 120 such that the camera 110d may not have its video data processed by the VMS 100. That is, cameras may be selectively "dropped" if the overall VMS 100 capacity is exceeded. The cameras may have a priority value assigned, which may in part be based on an allocation parameter as described above. For instance, if two cameras are provided that have overlapping spatial coverage (e.g., one camera monitors an area from a first direction and another camera monitors the same area but from a different direction), one of the cameras having overlapping spatial coverage may have a relatively low priority. In turn, upon disconnection of one of the cameras, continuity of monitoring of the area covered by the cameras may be maintained, while reducing the computational load of the system. Upon restoration of available computational load (e.g., due to a change in the computational load of other cameras or by adding another node to the system), the disconnected camera may be reallocated to a camera node using a load-balanced approach. In other contexts, other allocation parameters may be used to determine priority, including establishing classes of cameras. For instance, cameras may be allocated to an "internal camera" class or a "periphery camera" class based on a location/field of view of cameras being internal to a facility or external to a facility. In this case, one class of cameras may be given priority over the other class based on a particular scenario occurring which may either relate to the VMS 100 (e.g., a computational capacity/load of the VMS 100) or an external occurrence (e.g., an alarm at the facility, shift change at a facility, etc.).

The master node 140 may also comprise a storage manager 146. Video data captured by the cameras 110 is processed by the camera nodes 120 and may be stored in persistent storage once processed. The video data generated by the VMS 100 may include a relatively large amount of data for storage. Accordingly, the VMS 100 may generally enforce a storage policy for the video data captured and/or stored by the VMS 100. As will be described in greater detail below, abstracted storage resources of the VMS 100 facilitate persistent storage of video data by the camera nodes 120 in a manner that any camera node 120 may be able to access stored video data regardless of the camera node 120 that processed the video data. As such, any of the camera nodes 120 may be able to retrieve and reprocess video data according to the storage policy.

For instance, the storage policy may instruct that video data of a predefined currency (e.g., video data captured within the last 24 hours of operation of the VMS 100) may be stored in its entirety at an original resolution of the video data. However, long term storage of such video data at full resolution and frame rate may be impractical or infeasible. As such, the storage policy may include an initial period of full data retention in which all video data is stored in full resolution and subsequent treatment of video data after the initial period to reduce the size of the video data on disk.

To this end, the storage policy may dictate other parameters that control how video data is to be stored or whether such data is to be kept. The storage manager 146 may enforce the storage policy based on the parameters of the storage policy with respect to stored video data. For instance, based on parameters defined in the storage policy, video data may be deleted or stored in a reduced size (e.g., by reducing video resolution, frame rate, or other video parameters to reduce the overall size of the video data on disk). The reduction of the size of the stored video data on disk may be referred to as "pruning." One such parameter that governs pruning of the video data may relate to the amount of time that has elapsed since the video data was captured. For instance, data older than a given period (e.g., greater than 24 hours) may be deleted or reduced in size. Further still, multiple phases of pruning may be performed such that the data is further reduced in size or deleted as the video becomes less current.

Also, because any camera node 120 may be operative to retrieve any video data from storage for reprocessing, video data may be reprocessed (e.g., pruned) by a camera node different than the camera node that initially processed and stored the video data from a video camera. As such, reprocessing or pruning may be performed by any camera node 120. The reprocessing of video data by a camera node may be performed during idle periods for a camera node 120 or when a camera node 120 is determined to have spare computational capacity. This may occur at different times for different camera nodes but may occur during times of low processing load, such as after business hours or during a time in which a facility is closed or has reduced activity.

Still further, a parameter for pruning may relate to analytical metadata of the video data. As described in greater detail elsewhere in the present application, a camera node 120 may include an analytical model to apply video analysis to video data processed by a camera module. Such video analysis may include the generation of analytical metadata regarding the video. For example, the analytical model may include object detection, object tracking, facial recognition, pattern detection, motion analysis, or other data that is extracted from the video data upon analysis using the analytical model. The analytical metadata may provide a parameter for data pruning. For instance, any video data without motion may be deleted after an initial retention period. In another example, only video data comprising particular analytical metadata may be retained (e.g., only video data in which a given object is detected may be stored). Further still, only data from specific cameras 110 may be retained beyond an initial retainer period. Thus, a highly valuable video data feed (e.g., video data related to a critical location such as a building entrance or a highly secure area of a facility) may be maintained without a reduction in size. In any regard, the storage manager 146 may manage the application of such a storage policy to the video data stored by the VMS 100.

The master node 140 may also include a database manager 148. As noted above, video cameras 110 may be associated with any camera node 120 for processing and storage of video data from the video camera 120. Also, video data may be stored in an abstracted manner in a logical storage unit 150 that may or may not be physically co-located with a camera node 120. As such, the VMS 100 may beneficially maintain a record regarding the video data captured by the VMS 100 to provide important system metadata regarding the video data. Such system metadata may include, among other potential information, which video camera 110 captured the video data, a time/date when the video data was captured, what camera node 120 processed the video data, what video analysis was applied to the video data, resolution information regarding the video data, framerate information regarding the video data, size of the video data, and/or where the video data is stored. Such information may be stored in a database that is generated by the database manager 148. The database may include correlations between the video data and the system metadata related to the video data. In this regard, the provenance of the video data may be recorded by the database manager 148 and captured in the resulting database. The database may be used to manage the video data and/or track the flow of the video data through the VMS 100. For example, the storage manager 146, as discussed above, may utilize the database for the application of a storage policy to the data. Furthermore, requests for data from a client 130 may include reference to the database to determine a location for video data to be retrieved for a given parameter such as any one or more metadata portions described above. The database may be generated by the database manager 148, but the database may be distributed among all camera nodes 120 to provide redundancy to the system in the event of a failure or unavailability of the master node 140 executing the database manager 148. Database updates corresponding to at any given camera node 120 may be driven by specific events or may occur at a pre-determined time interval.

The database may further relate video data to analytical metadata regarding the video data. For instance, as described in greater detail below, analytical metadata may be generated by the application of a video analysis to the video data. Such analytical metadata may be embedded in the video data itself or be provided as a separate metadata file associated with a given video data file. In either regard, the database may relate such analytical metadata to the video data. This may assist in pruning activities or in searching for video data. Concerning the former, as described above, pruning according to a storage policy may include the treatment of video data based on the analysis metadata (e.g., based on the presence or absence of movement or detected objects). Furthermore, a search by a user may request all video data in which a particular object is detected or the like.

Figure 4:
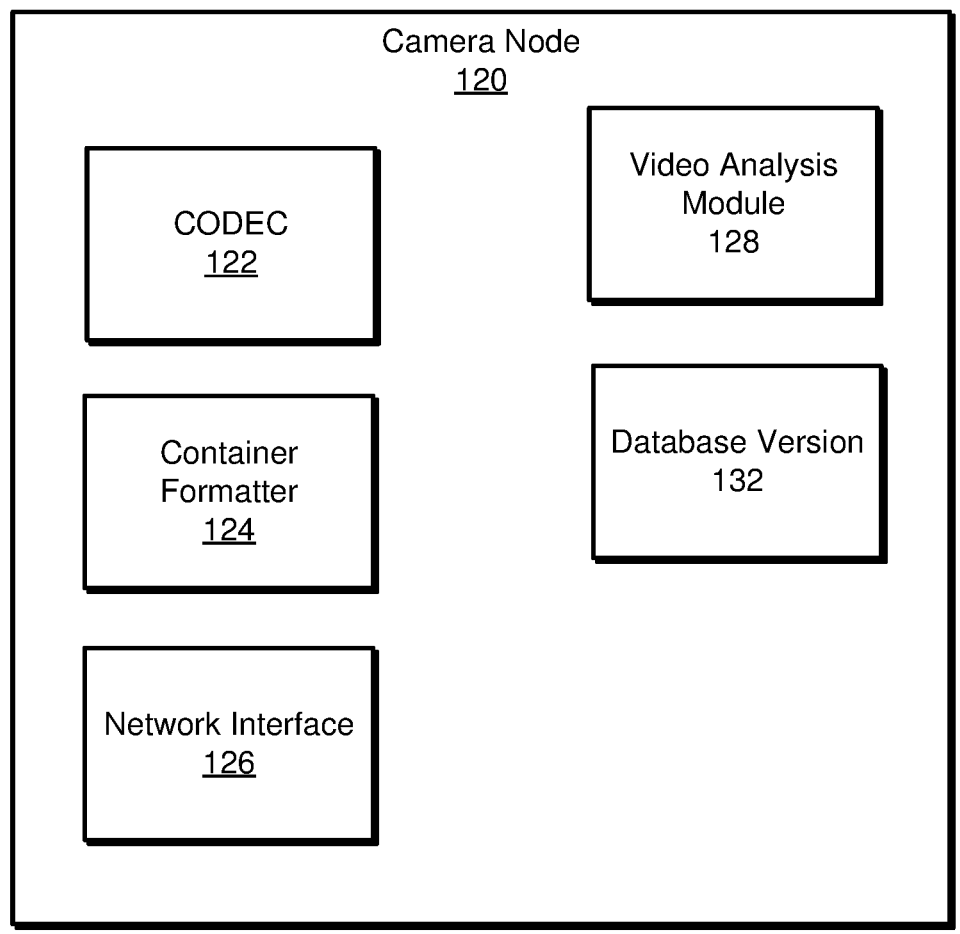
FIG. 4 depicts a schematic view of an example camera node of a distributed video surveillance system.

With further reference to FIG. 4, a schematic example of a camera node 120 is shown. As can be appreciated from the foregoing, the camera node 120 may include an instance of the database 132 provided by the master node 140 executing the database manager 148. In this regard, the camera node 120 may reference the database for retrieval and/or serving of video from the logical storage volume of the VMS 100 and/or for reprocessing video data (e.g., according to a storage policy).

The camera node 120 may include a video analysis module 128. The video analysis module 128 may be operative to apply an analytic model to the video data processed by the camera node 120 once received from a camera 110. The video analysis module 128 may apply a machine learning model to the video data processed at the camera node 120 to generate analytics metadata. For instance, as referenced above, the video analytics module 128 may apply a machine learning model to detect objects, track objects, perform facial recognition, or other analytics of the video data, which in turn may result in the generation of analytics metadata regarding the video data.

The camera node 120 may also comprise modules adapted for processing video data into an appropriate transport mechanism based on the nature of the data or the intended use of the data. In this regard, the camera node 120 includes a codec 122 (i.e., an encoder/decoder) that may decode received data and re-encode the data into a different encoded video format. The encoded video format may include packetized data such that each packet of data is encoded according to a selected encoded video format. The camera node 120 may also include a container formatter 124 that may package the encoded video packets into an appropriate container format. The camera module 120 further includes a network interface 126 that is operative to determine a communication protocol for the transfer of the encoded video packets in the digital container format.

The formatting of the video data into an appropriate transport mechanism may allow for optimized delivery and/or storage of video data. For instance, the video data may be delivered from the camera 110 to the camera node 120 using a real-time streaming protocol (RTSP). However, RTSP may not be an optimal protocol for storage and/or delivery of video data to a client 130 (e.g., RTSP is typically not supported by a standard web browser and, thus, usually requires specific software or plug-ins such as a particular video player to render video in a browser display). The camera node 120 may reformat the video data into an appropriate transfer mechanism based on the context in which the video data is requested.

Upon selection of an appropriate communication protocol, the network interface 126 may communicate the encoded video packets to a standard web browser at a client device using the communication protocol. In one example, a client 130 may request to view video data from a given video camera 110 in real-time. As such, an appropriate encoded video format, container format, and communication protocol may be selected by the codec 122, container formatter 124, and network interface 126, respectively, to facilitate a transport mechanism for serving the video data to the client 130 in real-time. In contrast, a client 130 may alternatively request video data from the logical storage unit of the VMS 100. As can be appreciated, the currency of such data is not as important as in the context of real-time data. A different one or more of the encoded video format, container format, and communication protocol may be selected. For example, in such a context in which the currency of the data is of less importance, a more resilient or more bandwidth-efficient encoded video format, container format, and communication protocol may be selected that has a higher latency for providing video to the client 130.

For purposes of illustration and not limitation, the transport mechanism may comprise any combination of encoded video format, container format, and communication protocol. Example transport mechanisms include JSMpeg, HTTP Live Streaming (HLS), MPEG-1, and WebRTC. JSMpeg utilizes MPEG-1 encoding (e.g., a MPEG-TS Demuxer, WebAssembly MPEG-1 Video & MPEG-2 Audio Decoders). In this regard, the JSMpeg transport mechanism uses Transport Stream (TS) container formatting and WebSocket communication protocol. In turn, the JSMpeg transport mechanism may be decoded at the client 130 using the JSMpeg program, which may be included in the web page (e.g., the HTML code or the like sent to the browser) and not require the use of a plug-in or other application other than the native web browser. For example, the JSMpeg transport mechanism may use WebGL & Canvas2D Renderers and WebAudio Sound Output. The JSMpeg transport mechanism may provide very low latency to the video data but utilizes somewhat higher bandwidth consumption relative to the other transport mechanisms described herein.

Another transport mechanism may be WebRTC, which may utilize an H.264 encoding, VP8, or another encoding. WebRTC may utilize a container format comprising MPEG-4 or WebM. The communication protocol for WebRTC may include an RTC peer connection to provide signaling. Video may be delivered using Web Socket. In the WebRTC transport mechanism, the standard browser may comprise a native decoder for decoding the encoded video data. WebRTC provides very low latency to the video data but increases the complexity of the system by utilizing the signaling server in the form of the RTC peer connection. However, the bandwidth usage of WebRTC is relatively low.

Yet another transport mechanism that may be utilized comprises HLS or MPEG-DASH. The encoded video format for HLS/MPEG-DASH may be MPEG-2, MPEG-4, or H.264. The container format may be MPEG-4, and the communication protocol may be HTTP. In this regard, the decoder may decode the encoded video data natively. The HLS/MPEG-DASH transport mechanism has higher latency than the other transport mechanisms described but has robust browser support and low network bandwidth usage.

As mentioned above, the VMS 100 may comprise an abstracted system that allows for the capture of video data, processing of the video data, and the storage of video data to be abstracted among various components of the VMS 100. For example, with further reference to FIG. 4, three "layers" of functionality of the VMS 100 are schematically described. Specifically, an acquisition layer 310, a processing layer 320, and a storage layer 330 are shown. The cameras 110 may comprise the acquisition layer 310. The camera nodes 120 and master node 140 may comprise the processing layer 320. In addition, a logical storage volume may comprise the storage 150 of the storage layer 330. The layers are referred to as abstracted layers because the particular combination of hardware components that acquire, process, and store the video data of the VMS system 100 may be variable and dynamically associated. That is, network communication among the hardware components of the VMS 100 may allow each of the acquisition, processing, and storage functions to be abstracted. Thus, for example, any one of the cameras 110 may provide video data to any one of the camera nodes 120, which may store the video data in the logical storage volume of the storage 150 without limitation.

As described above, the VMS 100 also includes a client 130 that may be in operative communication with the network 115. The client 130 may be operative to communicate with the VMS 100 to request and receive video data from the system 100. In this regard, the VMS 100 may both store video data from the video cameras 110 as well as provide a real-time stream of video data for observation by one or more users. For example, video surveillance cameras are often monitored in real-time by security personnel. By "real-time" or "near real-time," it is intended that the data provided have sufficient currency for security operations. In this regard, real-time or near real-time does not require instantaneous delivery of video data but may include delays that do not affect the efficacy of monitoring of the video data such as delays of less than 5 seconds, less than 3 seconds, or less than about 1 second.

One objective of the present disclosure is to facilitate a client 130 that may present real-time video data to a user in a convenient manner using a standard web browser application. Of particular note, it is particularly beneficial to allow the client 130 to execute commonly available and low-cost applications for access to the video data (e.g., in contrast to requiring platform-dependent proprietary software be preinstalled and preconfigured to interact with a management system). In this regard, a particular application type contemplated for utilization at a client 130 is a standard web browser. Examples of such browsers include Google Chrome, Mozilla Firefox, Microsoft Edge, Microsoft Internet Explorer, the Opera browser, and/or Apple Safari. Such standard web browsers are capable of natively processing certain data received via a network for the generation of a user interface at a client device. For instance, such standard web browsers often include native application programming interface (APIs) or other default functionality to allow the web browser to render user interfaces, facilitate user interaction with a web site or the like, and establish communication between the client and a server.

The client 130 may comprise a standard internet browser that is capable of communication with the web server 142 and/or one or more of the camera managers 120 to access the video data of the VMS 100. In contrast to previously proposed systems that rely on proprietary client software to be executed to communicate with a server for retrieval of video data, the client 130 of the VMS 100 may use any standard web browser application to access the video data. By standard internet browser application, it is meant that the browser application may not require any plug-in, add on, or another program to be installed or executed by the browser application other than the functionalities that are natively provided in the browser. It should be noted that certain functionality regarding a user interface for searching, retrieving, and displaying video may be delivered to the web browser by the web server 142 as code or the like, but any such functionality may be provided without user interaction or pre-configuration of the web browser. Accordingly, any such functionality is still deemed to be a native functionality of the web browser. In this regard, the client 130 may receive all necessary data to facilitate access to the video data of the VMS 100 from a web page served by the VMS 100 without having to download programs, install plug-ins, or otherwise modify or configure a browser application from a native configuration. That is, all necessary information and/or instruction required to receive and display a user interface and/or video data from the VMS 100 may either be provided natively with the standard browser or delivered from the VMS system 100 to allow for the execution of the client 130. Any appropriate computing device capable of executing a standard web browser application that is in operative communication with the network 115 may be used as a client 130 to access the video data of the VMS 100. For instance, any laptop computer, desktop computer, tablet computer, smartphone device, smart television, or another device that is capable of executing a standard internet browser application may act as a client 130.

Figure 6:
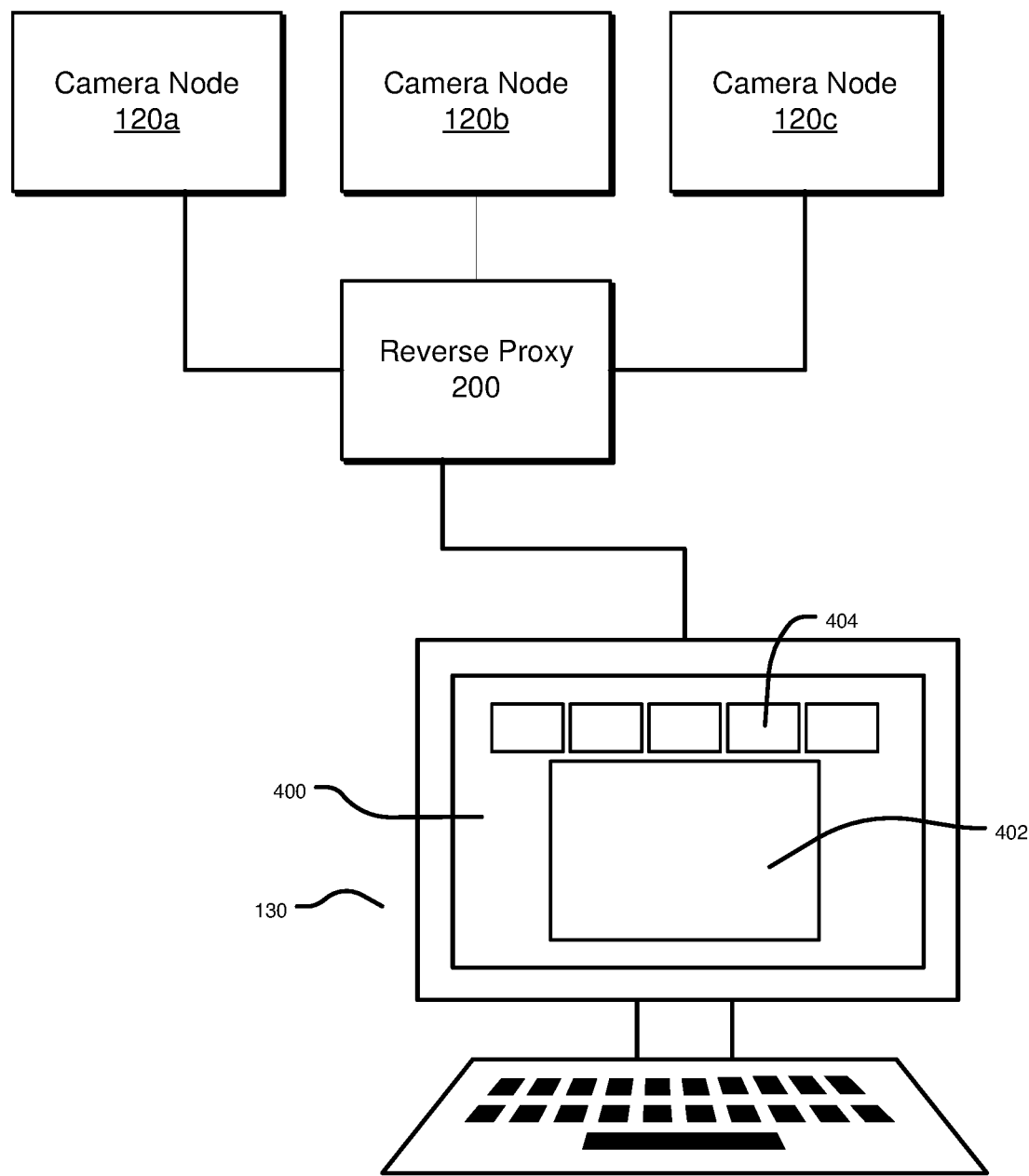
FIG. 6 depicts an example of a client in operative communication with a distributed video surveillance system to receive real-time data for presentation in a native browser interface of the client.

With further reference to FIG. 6, one example of the VMS 100 providing video data to a client 130 is depicted. In this context, a reverse proxy 200 may be utilized to facilitate communication with the client 130. Specifically, the reverse proxy 200 may be facilitated by the web server 142 of the master node 140, as described above. That is, the web server 142 may act as the reverse proxy 200. In this regard, a client 130 may connect to the reverse proxy 200. A user interface 400 comprising HTML or other web page content may be provided from the reverse proxy 200. For instance, the user interface 400 provided by the reverse proxy 400 may include a listing 404 or searchable index of the available video data from the cameras 110 of the VMS 100. This may include a listing of available live video data feeds for delivery in real-time to the client 130 or may allow for stored video data to be accessed. In the latter regard, a search function that allows for searching to be performed (e.g., using any video metadata including acquisition date/time, camera identify, facility location, and/or analytic metadata including objects identified from the video data or the like). In this regard, the web server 142 may act as a signaling server to provide information regarding available video data. Upon selection of a given portion of video data, a request may be issued from the client 130 to the reverse proxy 200 for specific video data. In turn, the reverse proxy 200 may communicate with a given one of the camera nodes 120 to retrieve the video data requested. The user interface 400 may also include a video display 402. The video data may be requested by the web server 142 from an appropriate camera node 120, formatted in an appropriate transport mechanism, and delivered by the web server 142 acting as the reverse proxy 200 to the client 130 for decoding and display of the video data in the video display 402. Accordingly, the use of the reverse proxy 200 allows all data delivered to the client 130 to be provided from a single server, which may have an appropriate security certificate, which complies with many security requirements of browsers.

In an example, the transport mechanism into which the camera node 120 processes the data may be at least in part based on a characteristic of the request from the client 130. In this regard, the reverse proxy 200 may determine a characteristic of the request. Examples of such characteristics include the nature of the video data (e.g., real-time or archived video data), an identity of the camera 110 that captured the video data, the network location of the client 130 relative to the reverse proxy 200 or the camera node 120 from which the video data is to be provided, or another characteristic. Based on the characteristic, an appropriate selection of an encoded video format, a container format, and a communication protocol for the processing of the video data by the camera node 120. The camera node 120 may provide the video data to the reverse proxy 200 for communication to the client 130. As described above, in at least some contexts, the video data provided to the client 130 may be real-time or near real-time video data that may be presented by the client 130 in the form of a standard web browser without requiring plug-ins or other applications to be installed at the client 130.

A user may wish to change the video data displayed in the user interface 400. In turn, a user may select a new video data source. In an implementation, the transport mechanism may be configured such that the new video data may be requested by the web server 142 from the appropriate camera node 120 and delivered to the user interface 400 without requiring a page reload. That is, the data in the video display 402 may be changed without requiring a reload of the user interface 400 generally. This may allow for greater utility to a user attempting to monitor multiple video data sources using the standard web browser.

The video data provided to the client 130 for rendering in the video display 402 may include metadata such as analytics metadata. As described above, such analytics metadata may relate to any appropriate video analysis applied to the video data and may include, for example, highlighting of detected objects, identification of objects, identification of individuals, object tracks, etc. Thus, the video data may be annotated to include some analytics metadata. The analytics metadata may be embodied in the video data or may be provided via a separate data channel. In the example in which the analytics metadata is provided via a separate channel, the client 130 may receive the analytics metadata and annotate the video data in the video display 402 when rendered in the user interface 400. Further still, it may be appreciated that different types of data comprising the user interface 400 may be delivered using different transport mechanisms to the client 130. For example, the foregoing examples of transport mechanisms may be used to deliver video data for display in the video display 402. However, the user interface itself may be communicated using HTML and secure TLS security protocol over a standard TCP/IP connection. Further still, metadata (e.g., analytical metadata) may be provided as embedded data in the video data or may be provided as a separate data stream for rendering in the user interface 130, as described above. In the case where the metadata is delivered using a separate data stream, the delivery of the metadata may be by way of a different transport mechanism than the video data itself.

Figure 5:
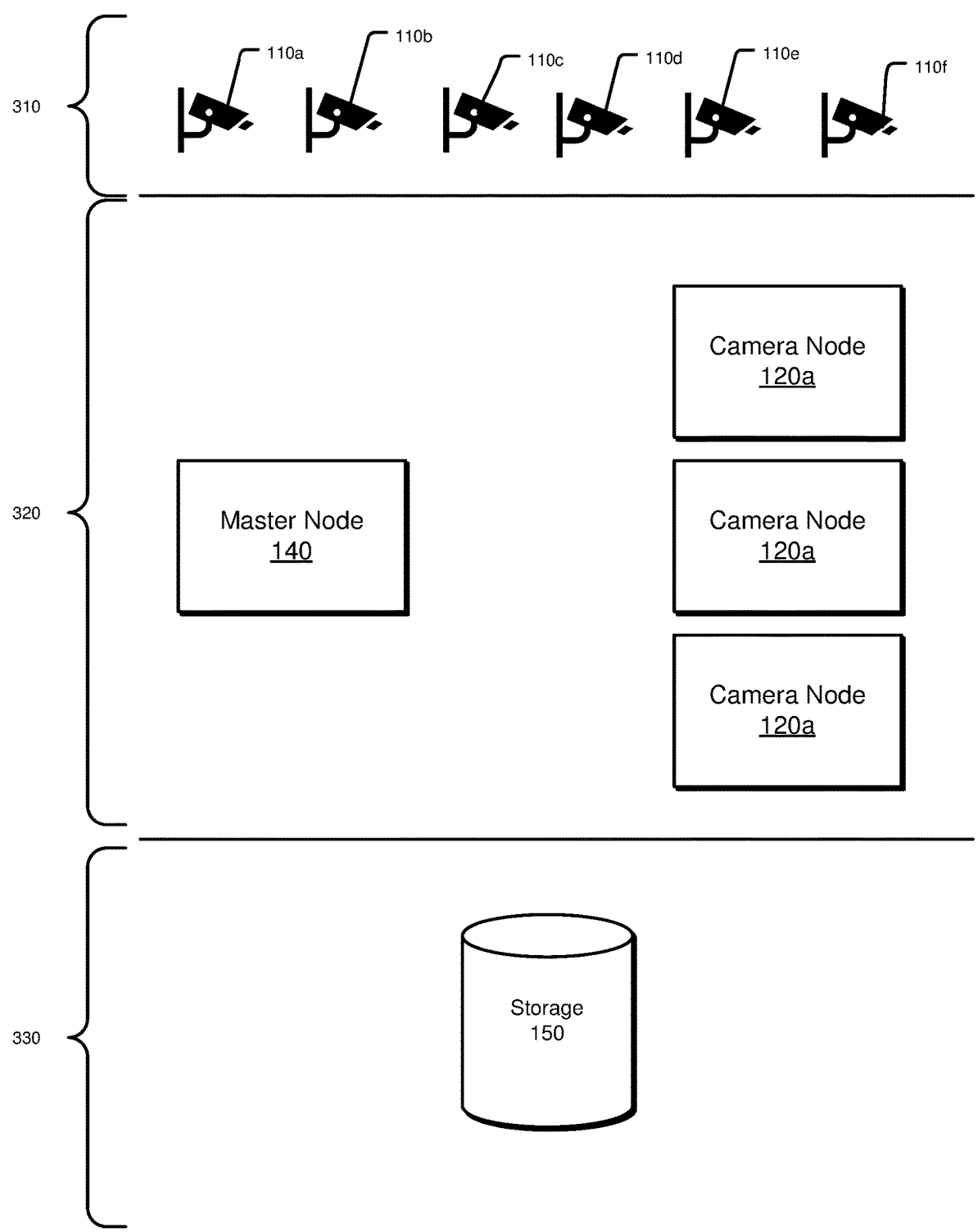
FIG. 5 depicts an example of abstracted camera, processing, and storage layers of a distributed video surveillance system.

With returned reference to FIG. 5, the abstraction of the functions of the VMS 100 into various functional layers may also provide an advantage in relation to the analysis of video data by the camera nodes 120. Specifically, the application of an analysis model (e.g., a machine learning module) may be relatively computationally taxing for a camera node 120. While the camera nodes 120 may be equipped with graphics processing units (GPUs) or other specifically adapted hardware that assist in performing the computational load, there may be certain instances in which the processing capacity of a given camera node 120 may not be capable of applying an analytics model to all of the video data from a given camera 110. For example, in certain contexts, video data from a given camera 110 may advantageously be separated into different portions of data that may be provided to different camera nodes 120 for separate processing of the different portions of data. By "slicing" the data in this manner, analysis on the different portions of the video data may occur simultaneously at different ones of the camera nodes 120, which may increase the speed and/or throughput of the analysis to be performed on the video data.

Figure 7:
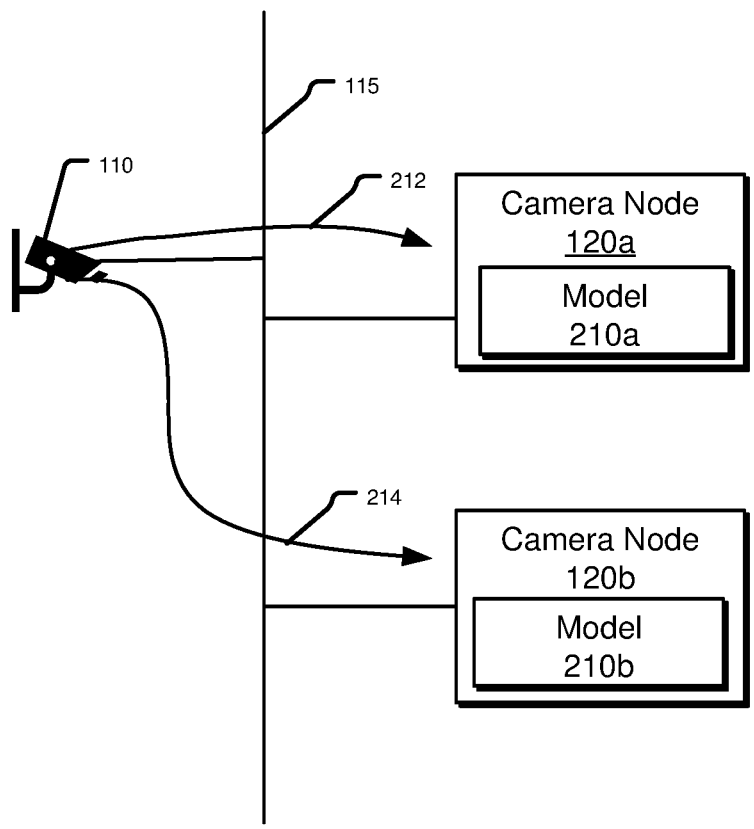
FIG. 7 depicts an example of distributed video analytics of a distributed video surveillance system.

Thus, as shown in FIG. 7, a camera 110 of the VMS 100 may be in operative communication with a network 115. At least a first node 120a and a second node 120b may also be in communication with the network 115 to receive video data from the camera 110. The first node 120a may include a first analytical model 210a, and the second node 120b may include a second analytical model 210b. The first analytical model 210a may be the same or different than the second analytical model 210b.

Video data from the camera 110 may be divided into at least a first video portion 212 and a second video portion 214. While referred to as video data portions, it should be understood that as little as a single frame of video data may comprise the respective portions of video data 212 and 214. The first portion of video data 212 may be provided to the first camera node 120a, and the second portion of video data 214 may be provided to the second camera node 120b.

The second portion of video data 214 may be provided to the second camera node 120b in response to a trigger detected by any of a master node, the camera node 120a, the camera node 120b, or the camera 110. The trigger may be based on any number of conditions or parameters. For example, a periodic trigger may be established such that the second portion of video data 214 is provided to the second camera node 120b in a periodic fashion based on time, an amount of camera data, or other periodic triggers. In this regard, the first analytical model 210a may require relatively low computational complexity relative to the second analytical model 210b. As such, it may not be computationally efficient to provide all of the video data to the second camera node 120b for processing using the second analytical model 210b. However, every Nth portion (e.g., comprising a fixed time duration, size of the video on disk, or given number of frames) may be provided from the camera 110 to the second camera node 210b, where N is a positive integer. In this regard, every hundredth second of video data may comprise the second portion of video data 214, every thousandth frame of video data may comprise the second portion of video data 214, etc.

In another context, the second portion of video data 214 may be provided to the second camera node 120b based on system video metadata or analytical video metadata for the first portion of video data 212. For instance, upon detection of a given object from the first portion of video data 212, subsequent frames of the video data comprising the second portion of video data 214 may be provided to the second camera node 120b. As an example of this operation, a person may be detected by the first camera node 120a from the first video data portion 212 using the first analytical model 210a. In turn, a second portion of video data 214 may be directed to the second camera node 120b for processing by the second analytical model 210b, which may be particularly adapted for facial recognition. In this regard, the video data from the camera 110 may be directed to a particular node for processing to allow for a different analytical model or the like to be applied.

Figure 12:
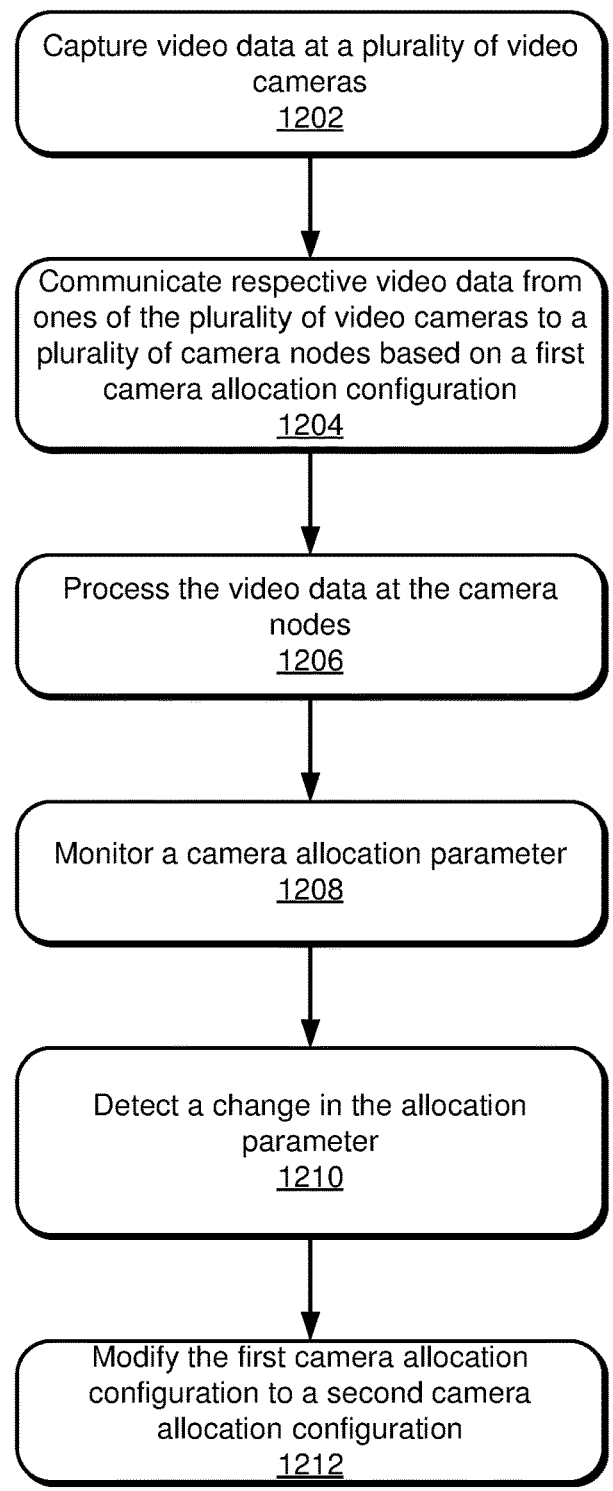
FIG. 12 depicts example operations for load balancing in a distributed video management system.

With reference to FIG. 12, example operations 1200 are shown according to an aspect of the present disclosure. The operations 1200 may include a capturing operation 1202 in which video data is captured at a plurality of video cameras.

As described above, the video cameras may be in operative communication with a network. In turn, the operations 1200 may also include a communicating operation 1204 to communicate the video data to a plurality of camera nodes. As described above, any one or more of the plurality of cameras may communicate 1204 their respective video data to any one or more of the camera nodes. Specifically, the cameras and camera nodes may establish communication based on a first camera allocation configuration provided by a camera allocator of a master node of the system (e.g., to load balance the video data processing across the camera nodes based on an allocation parameter).

The operations 1200 may include a processing operation 1206 to process the video data received by each respective camera node. Specifically, as described above, in at least one example, the processing operation 1206 may include encoding the video data into encoded video data packets, packaging the encoded video data packets into a transport container, and selecting a communication protocol for sending the packets of video data. Further still, the processing operation 1206 may include storing the video data in a storage of a VMS.

A monitoring operation 1208 may monitor a camera allocation parameter at one or more of the camera nodes. The monitoring operation 1208 may include, for example, receiving status information from the one or more camera nodes, monitoring system resource usage at the camera nodes, and/or monitoring network traffic. In any regard, the operations 1200 may also include a detecting operation 1210 in which the camera allocator may detect a change in the camera allocation parameter across one or more of the camera nodes. As described above, the change in the camera allocation parameter at one or more of the camera nodes may result from any of a number of occurrences including, for example, a camera node becoming unavailable, a new camera node becoming available, an increase in computational load at a camera node, a decrease in computational load at a camera node, a change in the nature of the video data received at a camera node from a video camera, a change in video analytics applied to video data, or the like.

In response to the detecting operation 1210, a modifying operation 1212 may be executed to modify the first camera allocation configuration to a second camera allocation configuration that is different than the first camera allocation configuration. Specifically, the modifying operation 1212 may be performed to balance the allocation parameter at the camera nodes in response to the detected change in the detecting operation 1210. Furthermore, the process may be iterative such that the monitoring operation 1208, detecting operation 1210, and modifying operation 1212 may be performed regularly during the operation of a VMS system. For instance, such monitoring may occur at a frequency sufficient such that any change (e.g., unavailability of a camera node) is detected without significant interruption of video data processing of the video data from cameras allocated to the camera nodes. For instance, such monitoring may occur at a rate of at least 1 Hz, although higher frequencies may be employed without limitation.

Figure 13:
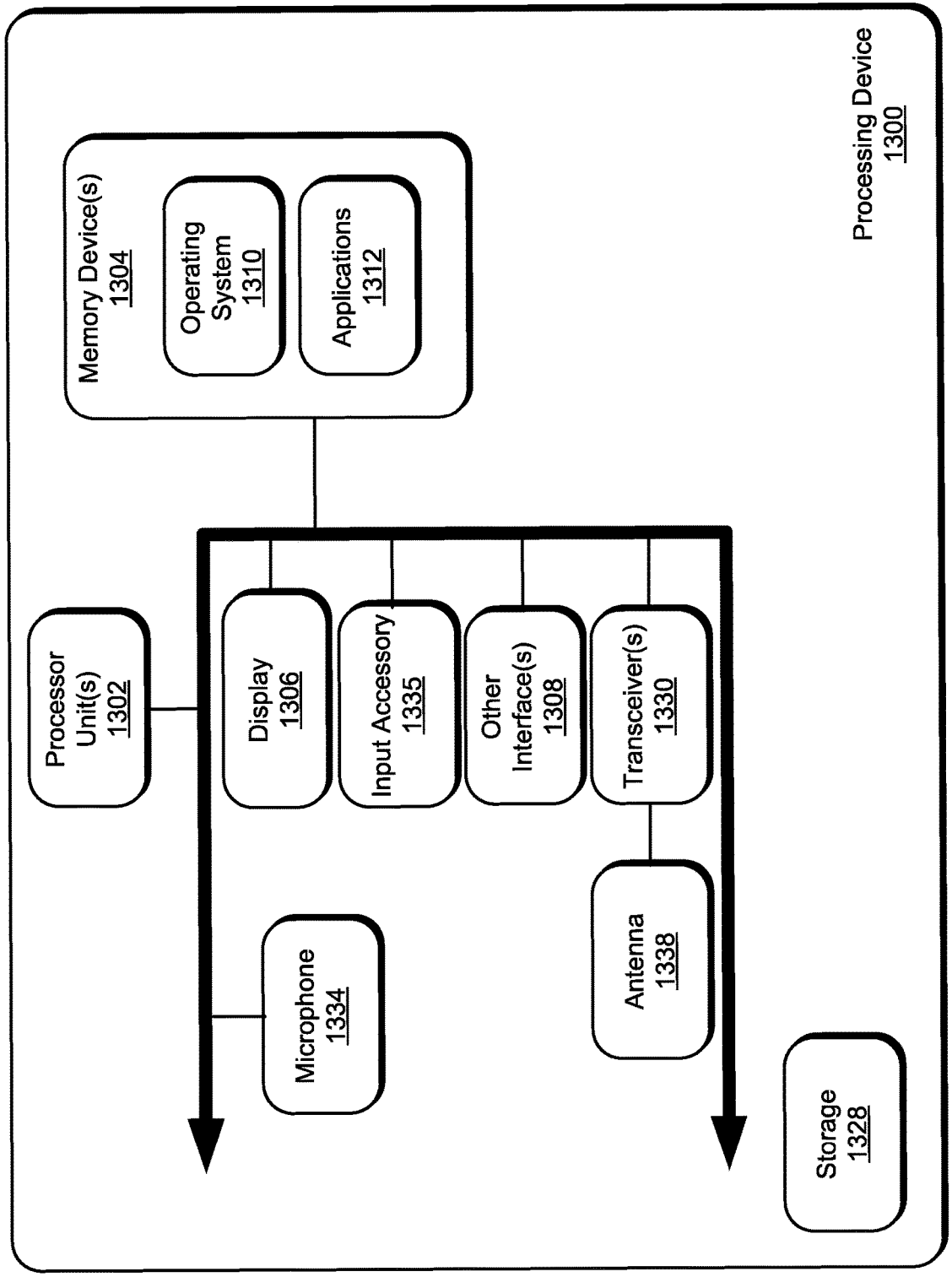
FIG. 13 depicts a processing device that may facilitate aspects of the present disclosure.

FIG. 13 illustrates an example schematic of a processing device 1300 suitable for implementing aspects of the disclosed technology. For instance, the processing device 1300 may generally describe the architecture of a camera node 130, a master node 140, and/or a client 130 The processing device 1300 includes one or more processor unit(s) 1302, memory 1304, a display 1306, and other interfaces 1308 (e.g., buttons). The memory 1304 generally includes both volatile memory (e.g., RAM) and nonvolatile memory (e.g., flash memory). An operating system 1310, such as the Microsoft Windows® operating system, the Apple macOS operating system, or the Linux operating system, resides in the memory 1304 and is executed by the processor unit(s) 1302, although it should be understood that other operating systems may be employed.

One or more applications 1312 are loaded in the memory 1304 and executed on the operating system 1310 by the processor unit(s) 1302. Applications 1312 may receive input from various input local devices such as a microphone 1334, input accessory 1335 (e.g., keypad, mouse, stylus, touchpad, joystick, an instrument mounted input or the like). Additionally, the applications 1312 may receive input from one or more remote devices such as remotely-located smart devices by communicating with such devices over a wired or wireless network using more communication transceivers 1330 and an antenna 1338 to provide network connectivity (e.g., a mobile phone network, Wi-Fi®, Bluetooth®). The processing device 1300 may also include various other components, such as a positioning system (e.g., a global positioning satellite transceiver), one or more accelerometers, one or more cameras, an audio interface (e.g., the microphone 1334, an audio amplifier and speaker and/or audio jack), and storage devices 1328. Other configurations may also be employed.

The processing device 1300 further includes a power supply 1316, which is powered by one or more batteries or other power sources and which provides power to other components of the processing device 1300. The power supply 1316 may also be connected to an external power source (not shown) that overrides or recharges the built-in batteries or other power sources.

An example implementation may include hardware and/or software embodied by instructions stored in the memory 1304 and/or the storage devices 1328 and processed by the processor unit(s) 1302. The memory 1304 may be the memory of a host device or of an accessory that couples to the host.

The processing system 1300 may include a variety of tangible processor-readable storage media and intangible processor-readable communication signals. Tangible processor-readable storage can be embodied by any available media that can be accessed by the processing system 1300 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 1300. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

One general aspect of the present disclosure includes a method for processing video data in a video surveillance system. The method includes capturing video data at a plurality of video cameras and communicating the video data from the plurality of video cameras to at least one camera node over a communication network according to a first camera allocation configuration. The method also includes executing a video processing module at a camera node to process the video data received at the camera node and monitoring a camera allocation parameter at the camera node. The camera allocation parameter is at least in part based on the video data received at the at least one camera node. The method further includes modifying the first camera allocation configuration to a second camera allocation configuration different than the first camera allocation configuration at least in part based on the camera allocation parameter.

Implementations may include one or more of the following features. For example, the method may also include operating a plurality of camera nodes such that, in the first camera allocation configuration, each of the plurality of camera nodes is operative to receive video data from a respective subset of the plurality of video cameras. The method may also include detecting a change in a number of the available camera nodes in the video surveillance system. The second camera allocation configuration may include allocation of the plurality of video cameras to the available camera nodes after the detecting the change in the number of the available camera nodes.

In an example, the modifying operation is in response to a computational capacity of the camera node exceeding a threshold. This may be in response to an increased computational load associated with video analysis being performed by the camera node on the video data by the video processing module. In an example, the second camera allocation includes the reallocation of a video camera of the plurality of cameras to another camera node having a video analysis capability of the camera node from which the video camera is reallocated.

In an example, the camera allocation parameter comprises a field of view of each of the plurality of cameras. The second camera allocation may include the camera node disassociating from a video camera that shares an at least partially overlapping field of view with another video camera associated with the camera node.

Another general aspect of the present disclosure includes a video surveillance system. The system includes a plurality of video cameras operative to capture video data and at least one camera node operative to receive video data from one or more video cameras of the plurality of video cameras according to a first camera allocation configuration. The system also includes a video processing module executing at the at least one video camera node to process the video data received at the at least one camera node. The system further includes a master node in operative communication with the at least one camera node to monitor a camera allocation parameter at least in part based on the video data received at the at least one camera node and, in response to a change in the camera allocation parameter, modify the first camera allocation configuration to a second camera allocation configuration different than the first camera allocation configuration.

Implementations may include one or more of the following features. In an example, the system may include a plurality of camera nodes. In the first camera allocation configuration, each of the plurality of camera nodes may be operative to receive video data from a respective subset of the plurality of video cameras. The master node may be operative to detect a change in a number of the available camera nodes in the video surveillance system and the second camera allocation configuration comprises allocation of the plurality of video cameras to the available camera nodes after the detecting the change in the number of the available camera nodes.

In an example, the master node may modify the first camera allocation configuration to the second camera allocation configuration in response to a computational capacity of the camera node exceeding a threshold in response to an increased computational load associated with video analysis being performed by the camera node on the video data by the video processing module. In an example, the second camera allocation may include reallocation of a video camera of the plurality of cameras to another camera node having a video analysis capability of the camera node from which the video camera is reallocated.

In an example, the camera allocation parameter may include a field of view of each of the plurality of cameras. The second camera allocation may include the camera node disassociating from a video camera that shares an at least partially overlapping field of view with another video camera associated with the camera node.

Another general aspect of the present disclosure includes one or more tangible processor-readable storage media embodied with instructions for executing on one or more processors and circuits of a device a process for processing video data in a video surveillance system. The process may include capturing video data at a plurality of video cameras and communicating the video data from the plurality of video cameras to at least one camera node over a communication network according to a first camera allocation configuration. The process also includes executing a video processing module at a camera node to process the video data received at the camera node and monitoring a camera allocation parameter at the camera node. The camera allocation parameter is at least in part based on the video data received at the at least one camera node. The process also includes modifying the first camera allocation configuration to a second camera allocation configuration different than the first camera allocation configuration at least in part based on the camera allocation parameter.

Implementations may include one or more of the following features. In an example, the process may include operating a plurality of camera nodes. In the first camera allocation configuration, each of the plurality of camera nodes may be operative to receive video data from a respective subset of the plurality of video cameras. The process may also include detecting a change in a number of the available camera nodes in the video surveillance system. The second camera allocation configuration may include allocation of the plurality of video cameras to the available camera nodes after the detecting the change in the number of the available camera nodes.

In an example, the modifying may be in response to a computational capacity of the camera node exceeding a threshold in response to an increased computational load associated with video analysis being performed by the camera node on the video data by the video processing module. The second camera allocation may include reallocation of a video camera of the plurality of cameras to another camera node having a video analysis capability of the camera node from which the video camera is reallocated. For example, the camera allocation parameter comprises a field of view of each of the plurality of cameras. The second camera allocation may include the camera node disassociating from a video camera that shares an at least partially overlapping field of view with another video camera associated with the camera node.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order unless explicitly claimed otherwise or a specific order is inherently necessitated by the claim language.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for processing video data in a video surveillance system, comprising:
   capturing video data at a plurality of video cameras;
   communicating the video data from the plurality of video cameras to a plurality of camera nodes over a communication network according to a first camera allocation configuration;
   executing a video processing module at each of the plurality of camera nodes to process the video data received at the camera node;
   monitoring a camera allocation parameter at each of the plurality of camera nodes, wherein the camera allocation parameter is at least in part based on a computational load for processing the video data received at the camera node by the video processing module; and
   modifying the first camera allocation configuration to a second camera allocation configuration different than the first camera allocation configuration in response to a computational capacity of a given camera node of the plurality of camera nodes exceeding a threshold in response to an increased computational load associated with video analysis being performed by the given camera node on the video data by the video processing module, wherein the second camera allocation provides load balancing of the camera allocation parameter across all available camera nodes including the given camera node and at least one other camera node of the plurality of camera nodes.

2. The method of claim 1, further comprising:
   detecting a change in a number of the available camera nodes in the video surveillance system; and
   wherein the second camera allocation configuration comprises allocation of the plurality of video cameras to the available camera nodes after the detecting the change in the number of the available camera nodes.

3. The method of claim 1, wherein the second camera allocation comprises reallocation of a video camera of the plurality of cameras to another camera node having a video analysis capability of the given camera node from which the video camera is reallocated.

4. The method of claim 1, wherein the camera allocation parameter comprises a field of view of each of the plurality of cameras.

5. The method of claim 4, wherein the second camera allocation includes the camera node disassociating from a video camera that shares an at least partially overlapping field of view with another video camera associated with the camera node.

6. A video surveillance system, comprising:
   a plurality of video cameras operative to capture video data;
   a plurality of camera nodes operative to receive video data from one or more video cameras of the plurality of video cameras according to a first camera allocation configuration;
   a video processing module executing at each of the plurality of video camera nodes to process the video data received at each of the plurality of camera nodes; and
   a master node in operative communication with the plurality of camera nodes to monitor a camera allocation parameter of each of the plurality of video camera nodes that is at least in part based on a computational load for processing the video data received at a camera node and, in response to a change in the camera allocation parameter resulting from a computational capacity of a given camera node of the plurality of video camera nodes exceeding a threshold in response to an increased computational load associated with video analysis being performed by the given camera node on the video data by the video processing module, modify the first camera allocation configuration to a second camera allocation configuration different than the first camera allocation configuration, wherein the second camera allocation provides load balancing of the camera allocation parameter across all available camera nodes including the given camera node and at least one other camera node of the plurality of camera nodes.

7. The system of claim 6,
   wherein the master node is operative to detect a change in a number of the available camera nodes in the video surveillance system and the second camera allocation configuration comprises allocation of the plurality of video cameras to the available camera nodes after the detecting the change in the number of the available camera nodes.

8. The system of claim 6, wherein the second camera allocation comprises reallocation of a video camera of the plurality of cameras to another camera node having a video analysis capability of the camera node from which the video camera is reallocated.

9. The system of claim 6, wherein the camera allocation parameter comprises a field of view of each of the plurality of cameras.

10. The system of claim 9, wherein the second camera allocation includes the camera node disassociating from a video camera that shares an at least partially overlapping field of view with another video camera associated with the camera node.

11. One or more tangible non-transitory processor-readable storage media embodied with instructions for executing on one or more processors and circuits of a device a process for processing video data in a video surveillance system, comprising:
    capturing video data at a plurality of video cameras;
    communicating the video data from the plurality of video cameras to a plurality of camera nodes over a communication network according to a first camera allocation configuration;
    executing a video processing module at each of the plurality of camera nodes to process the video data received at the camera node;
    monitoring a camera allocation parameter at each of the plurality of camera nodes, wherein the camera allocation parameter is at least in part based on a computational load for processing the video data received at the camera node by the video processing module; and
    modifying the first camera allocation configuration to a second camera allocation configuration different than the first camera allocation configuration in response to a computational capacity of a given camera node of the plurality of camera nodes exceeding a threshold in response to an increased computational load associated with video analysis being performed by the given camera node on the video data by the video processing module, wherein the second camera allocation provides load balancing of the camera allocation parameter across all available camera nodes including the given camera node and at least one other camera node of the plurality of camera nodes.

12. The one or more tangible non-transitory processor-readable storage media of claim 11, the process further comprising:
- detecting a change in a number of the available camera nodes in the video surveillance system; and
- wherein the second camera allocation configuration comprises allocation of the plurality of video cameras to the available camera nodes after the detecting the change in the number of the available camera nodes.

13. The one or more tangible non-transitory processor-readable storage media of claim 11, wherein the second camera allocation comprises reallocation of a video camera of the plurality of cameras to another camera node having a video analysis capability of the camera node from which the video camera is reallocated.

14. The one or more tangible non-transitory processor-readable storage media of claim 11, wherein the camera allocation parameter comprises a field of view of each of the plurality of cameras.

15. The one or more tangible non-transitory processor-readable storage media of claim 14, wherein the second camera allocation includes the camera node disassociating from a video camera that shares an at least partially overlapping field of view with another video camera associated with the camera node.

* * * * *